US011994291B2

(12) United States Patent
Nath et al.

(10) Patent No.: US 11,994,291 B2
(45) Date of Patent: May 28, 2024

(54) PERFORMANCE FACTOR FOR A COMBUSTION LINER

(71) Applicant: General Electric Company, Schenectady, NY (US)

(72) Inventors: Hiranya Nath, Bengaluru (IN); Ravindra Shankar Ganiger, Bengaluru (IN); Ajoy Patra, Bengaluru (IN); Rajendra Wankhade, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/060,808

(22) Filed: Dec. 1, 2022

(65) Prior Publication Data

US 2024/0027066 A1 Jan. 25, 2024

(30) Foreign Application Priority Data

Jul. 21, 2022 (IN) ............................. 202211041697

(51) Int. Cl.
*F23R 3/00* (2006.01)
*F23R 3/16* (2006.01)
*F23R 3/46* (2006.01)

(52) U.S. Cl.
CPC ................ *F23R 3/002* (2013.01); *F23R 3/16* (2013.01); *F23R 3/46* (2013.01); *F05D 2220/32* (2013.01); *F05D 2240/35* (2013.01)

(58) Field of Classification Search
CPC .... F05D 2240/35; F05D 2220/32; F23R 3/46; F23R 3/16; F23R 3/002
See application file for complete search history.

(56) References Cited

U.S. PATENT DOCUMENTS

| | | | |
|---|---|---|---|
| 3,064,425 A | 11/1962 | Hayes | |
| 3,826,082 A | 7/1974 | Smuland et al. | |
| 3,851,467 A * | 12/1974 | Sherman | F23R 3/26 417/198 |
| 4,050,241 A | 9/1977 | DuBell | |
| 4,269,032 A | 5/1981 | Meginnis et al. | |
| 6,237,344 B1 | 5/2001 | Lee | |
| 6,375,095 B1 | 4/2002 | Feder et al. | |
| 10,281,152 B2 | 5/2019 | Chang | |
| 10,514,171 B2 | 12/2019 | Wagner et al. | |
| 2008/0078182 A1 * | 4/2008 | Evulet | F02C 3/14 60/737 |
| 2015/0362192 A1 | 12/2015 | Cunha et al. | |
| 2019/0249874 A1 * | 8/2019 | Gandikota | F23R 3/16 |

FOREIGN PATENT DOCUMENTS

WO 9964791 A1 12/1999

OTHER PUBLICATIONS

Meherwan P. Boyce, Gas Turbine Engineering Handbook (fourth edition), 2012.*

* cited by examiner

*Primary Examiner* — Todd E Manahan
*Assistant Examiner* — Rodolphe Andre Chabreyrie
(74) *Attorney, Agent, or Firm* — Venable LLP; Elizabeth C. G. Gitlin; Michele V. Frank

(57) ABSTRACT

An annular combustor includes a combustion liner defining a combustion chamber, the combustion liner having an outer liner and an inner liner and a plurality of dimples in the combustion liner. The combustion liner is characterized by a performance factor greater than or equal to one and less than or equal to seven. An engine includes the annular combustor.

18 Claims, 26 Drawing Sheets

PERFORMANCE FACTOR FOR A COMBUSTION LINER

CROSS REFERENCE TO RELATED APPLICATIONS

The present application claims the benefit of Indian Patent Application No. 202211041697, filed on Jul. 21, 2022, which is hereby incorporated by reference herein in its entirety.

TECHNICAL FIELD

The present disclosure relates to a combustor for a gas turbine engine.

BACKGROUND

A gas turbine engine may include a combustion section having a combustor that generates combustion gases discharged into a turbine section of the engine. The combustion section may include a combustion liner that defines a combustion chamber therein. The combustion chamber includes a primary combustion zone, a dilution zone, and a post dilution zone.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
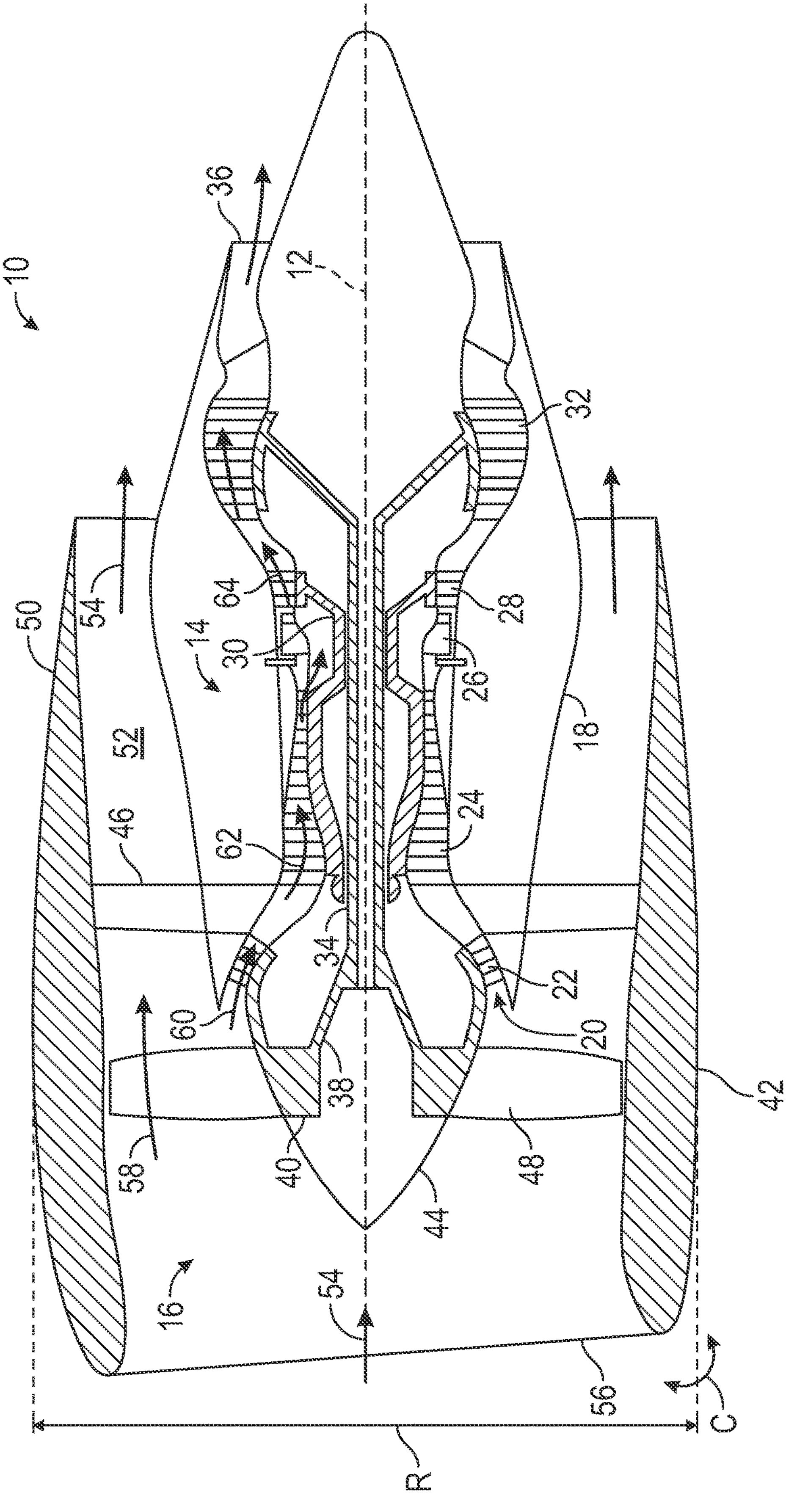
FIG. 1 illustrates a schematic, cross-sectional view of an engine, taken along a centerline axis of the engine, according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustion of fuel and air within a combustion chamber of a gas turbine engine generates high-temperature products (e.g., hot gases) within the combustion chamber. The high-temperature combustion products negatively impact the combustion liner that defines the combustion chamber. Combustion within the combustion liners causes a high thermal gradient across the combustion liner, which impacts distress. The inventors observed that the converging nature of combustion liners causes flame scrubbing on the inner surfaces (e.g., the surfaces of the outer liner and the inner liner that face the combustion chamber are exposed to the flame near the fuel nozzle assembly and to the high temperature combustion products) of the combustion liner. The flame scrubbing results in distress on the combustion liner, which ultimately leads to wear and, possibly, failure, of the combustion liner. The inventors, thus, sought to reduce or eliminate this flame scrubbing of the converging combustion liner to prolong the life of the combustion liner and reduce combustion liner distress. The inventors sought to reduce hot gases and high-temperature combustion products from flowing near the inner liner walls for a converging combustor liner. To this end, the inventors conceived of a wide variety of combustors having different shapes and sizes in order to determine which embodiment(s) were most promising for a variety of contemplated engine designs. The various embodiments described herein and illustrated in the figures are combustion liners designed to reduce liner distress, improve operability of the engine, improve relight performance, promote carbon monoxide burn-out (e.g., improve local residence time).

Referring to FIG. 1, an engine 10 has a longitudinal, axial engine centerline 12 extending therethrough along an axial direction A. The engine 10 defines a radial direction R extending perpendicular from the engine centerline 12 and a circumferential direction C (shown in/out of the page in FIG. 1) extends perpendicular to both the engine centerline 12 and the radial direction R. The engine 10 may be, for example, but not limited to, a gas turbine engine, a turbofan engine, an open rotor engine, a turboshaft engine, a turbojet engine, or a turboprop configuration engine, including marine and industrial turbine engines and auxiliary power units.

The engine 10 includes a core engine 14 and a fan section 16 positioned upstream thereof. The core engine 14 generally includes an outer casing 18 that defines an annular inlet 20. In addition, the outer casing 18 may further enclose and support a low-pressure compressor 22 for increasing the pressure of the air that enters the core engine 14 to a first pressure level. A multi-stage, high-pressure compressor 24 may then receive the pressurized air from the low-pressure compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The combustor 26 may be an annular combustor. High energy combustion products 64 are directed from the combustor 26 along the hot gas path of the engine 10 to a high-pressure turbine 28 for driving the high-pressure compressor 24 via a high-pressure shaft 30, also referred to as a shaft 30, and, then, to a low-pressure turbine 32 for driving the low-pressure compressor 22 and fan section 16 via a low-pressure shaft 34 that is generally coaxial with high-pressure shaft 30. After driving each of the high-pressure turbine 28 and the low-pressure turbine 32, the combustion products 64 may be expelled from the core engine 14 via an exhaust nozzle 36 to provide propulsive jet thrust.

Additionally, as shown in FIG. 1, the fan section 16 of the engine 10 includes a rotatable, axial-flow, fan rotor 38 surrounded by an annular nacelle 42. In particular embodiments, the low-pressure shaft 34 may be connected directly to the fan rotor 38 or a rotor disk 40, such as in a direct-drive configuration. In alternative configurations, the low-pressure shaft 34 may be connected to the fan rotor 38 via a speed reduction device such as a reduction gear gearbox in an indirect-drive or a geared-drive configuration. Such speed reduction devices may be included between any suitable shafts/spools within the engine 10 as desired or required. Additionally, the fan rotor 38 and/or rotor disk 40 may be enclosed or formed as part of a fan hub 44.

The nacelle 42 may be supported relative to the core engine 14 by a plurality of substantially radially-extending, circumferentially-spaced outlet guide vanes 46. As such, the nacelle 42 may enclose the fan rotor 38 and a plurality of fan blades 48. Each of the fan blades 48 may extend between a root and a tip in the radial direction R relative to the engine centerline 12. A downstream section 50 of the nacelle 42 may extend over an outer portion of the core engine 14 so as to define a secondary airflow or a bypass conduit 52 that provides additional propulsive jet thrust.

During operation of the engine 10, an initial air flow 54 may enter the engine 10 through an inlet 56 of the nacelle 42. The initial air flow 54 then passes through the fan blades 48 and splits into a first compressed air flow 58 that moves through the bypass conduit 52 and a second compressed air flow 60, also referred to as a core airflow 60, that enters the low-pressure compressor 22. The pressure of the core airflow 60 is then increased and enters the high-pressure compressor 24 as air flow 62. After mixing with fuel and being combusted within the combustor 26, the combustion products 64 exit the combustor 26 and flow through the high-pressure turbine 28. Thereafter, the combustion products 64 flow through the low-pressure turbine 32 and exit the exhaust nozzle 36 to provide thrust for the engine 10.

Figure 2:
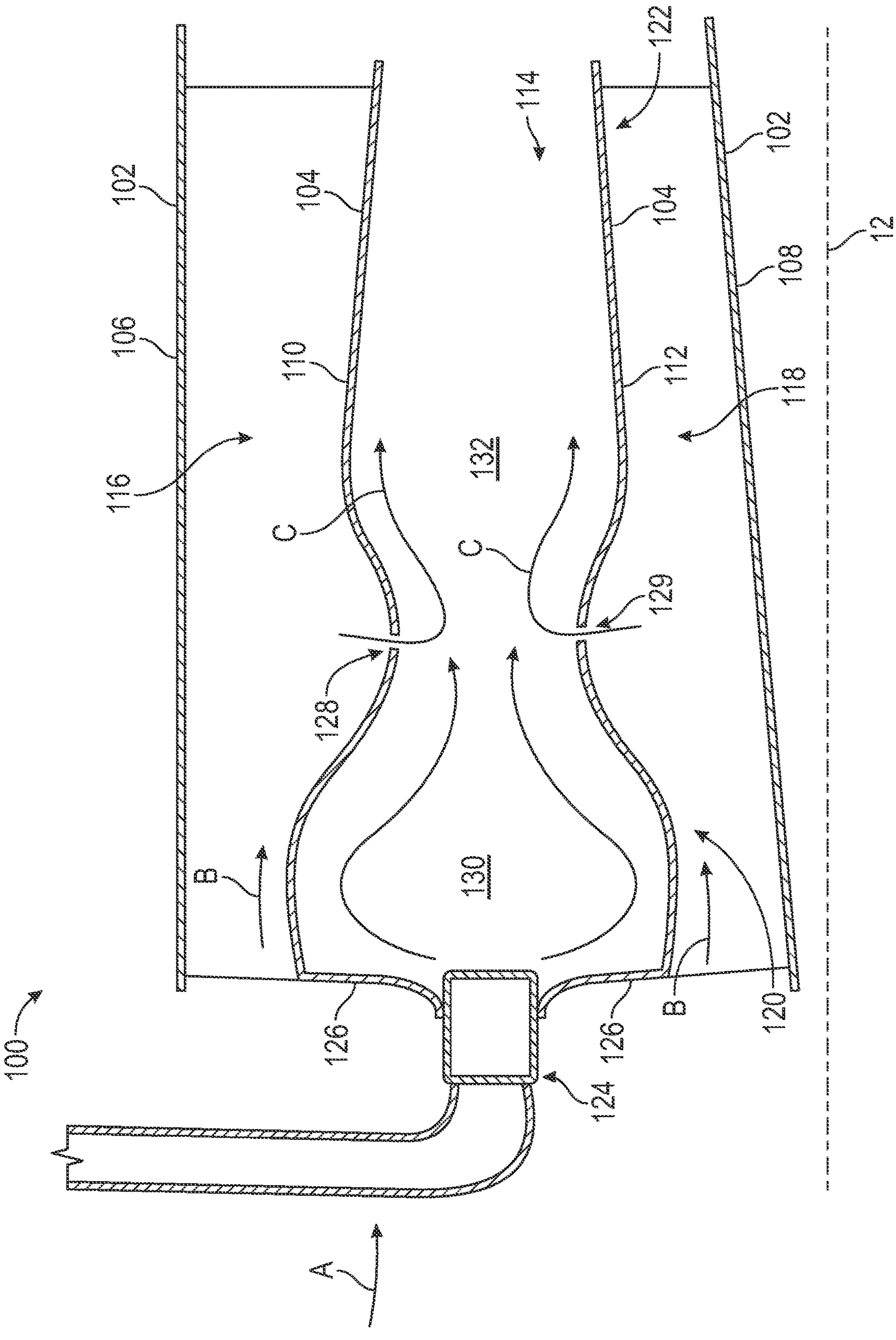
FIG. 2 illustrates a schematic, cross-sectional view of a combustor of the combustion section of the engine of FIG. 1, taken along a centerline axis of the engine, according to an embodiment of the present disclosure.

FIG. 2 illustrates a combustor 100, which may be the combustor 26 and may be employed in the engine 10 of FIG. 1. The combustor 100 includes a combustor casing 102 and a combustion liner 104. The combustor casing 102 has an outer casing 106 and an inner casing 108, and the combustion liner 104 has an outer liner 110 and an inner liner 112. A combustion chamber 114 is formed within the combustion liner 104. More specifically, the outer liner 110 and the inner liner 112 are disposed between the outer casing 106 and the inner casing 108. The outer liner 110 and the inner liner 112 are spaced radially from each other such that the combustion chamber 114 is defined therebetween. The outer casing 106 and the outer liner 110 form an outer passage 116 therebetween, and the inner casing 108 and the inner liner 112 form an inner passage 118 therebetween.

The combustion chamber 114 has a forward section 120 (upstream section) and an aft section 122 (downstream section). A fuel nozzle assembly 124 is positioned at the forward section 120 of the combustion chamber 114. The fuel nozzle assembly 124 may include a swirler (omitted for clarity). In this example, the combustor 100 is an annular combustor and includes a plurality of fuel nozzle assemblies 124 arranged in an annular configuration with the plurality of fuel nozzle assemblies 124 aligned in a circumferential direction of the combustor 100. That is, the combustor 100 and the plurality of fuel nozzle assemblies 124 extend circumferentially about the engine centerline 12. A dome 126 is coupled to the upstream ends of outer liner 110 and the inner liner 112, respectively. A portion of a compressed air flow from the high-pressure compressor 24 (FIG. 1) enters the combustor 100 (through the dome 126 and/or the fuel nozzle assembly 124, not shown for clarity) as indicated by air flow A to support combustion within the combustion chamber 114. Another portion of the compressed air, indicated by air flow B, flows around the outside of the combustion liner 104 through the outer passage 116 and the inner passage 118. The air flow B is introduced into the combustion chamber 114 through a plurality of circumferentially spaced dilution holes 128 formed in the outer liner 110 and a plurality of circumferentially spaced dilution holes 129 formed in the inner liner 112 at positions downstream of the fuel nozzle assembly 124.

The fuel nozzle assembly 124 injects fuel into the turbulent air flow A and the turbulence promotes rapid mixing of the fuel with the air. The resulting mixture of fuel and compressed air is discharged into a primary combustion zone 130 of the combustion chamber 114 and combusted in the primary combustion zone 130 of the combustion chamber 114, generating combustion gases (combustion products), which accelerate as the combustion gases leave the combustion chamber 114. Downstream of the primary combustion zone 130, the plurality of dilution holes 128 introduce the air flow C from the outer passage 116 and the inner passage 118 into a post dilution zone 132 of the combustion chamber 114 to cool the combustion products before the combustion gases exit the aft section 122 of the combustor 100 and enter the high-pressure turbine 28 (FIG. 1). The forward section 120 includes the primary combustion zone 130 and the aft section 122 includes the post dilution zone 132.

Figure 3:
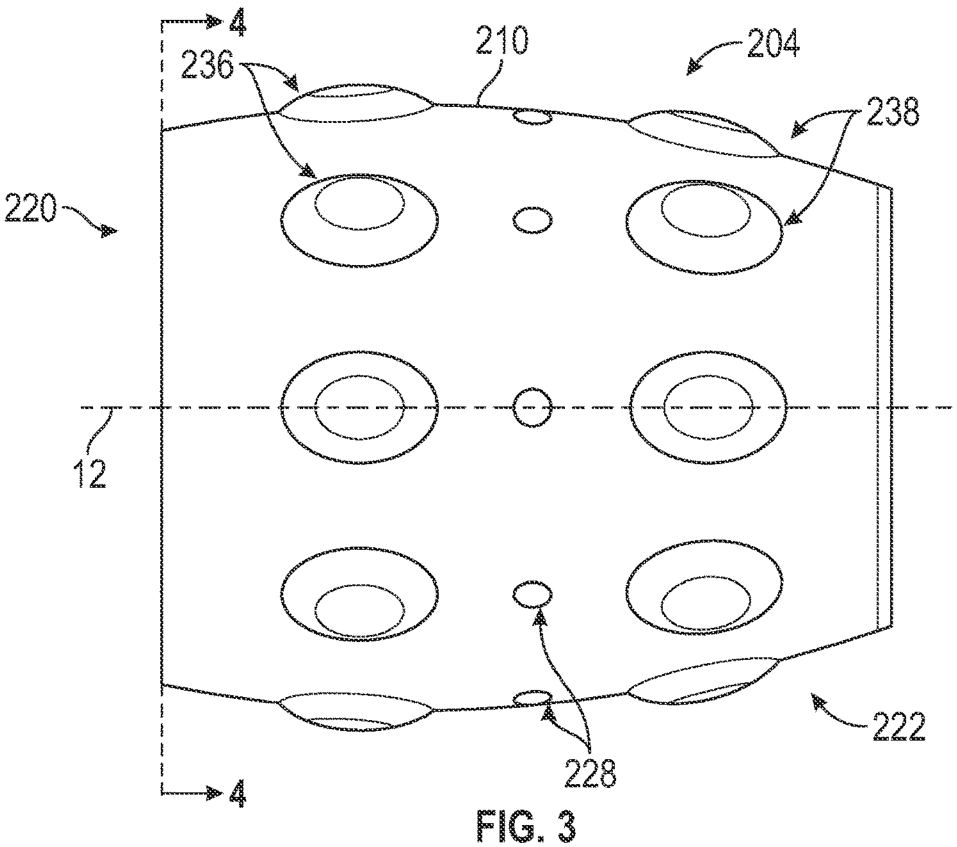
FIG. 3 illustrates a schematic, side view of a combustion liner for a combustor, for the engine of FIG. 1, according to an embodiment of the present disclosure.
Figure 4:
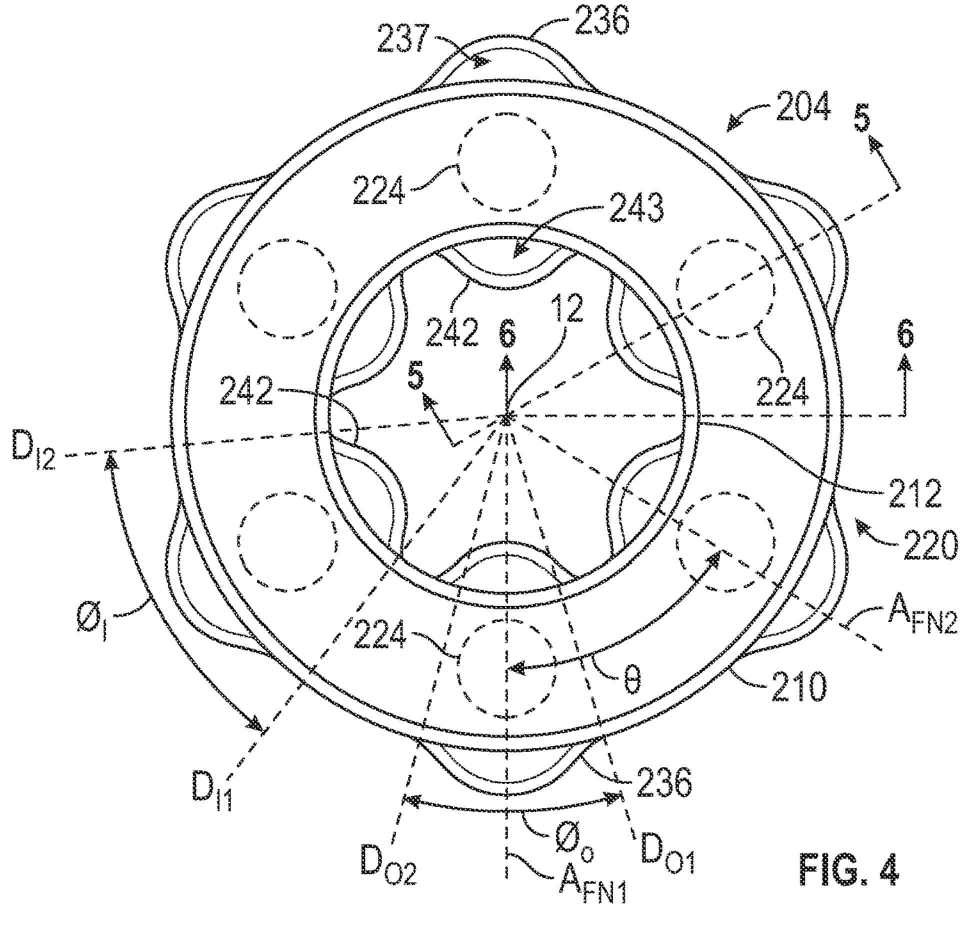
FIG. 4 illustrates a schematic, end view, taken along line 4-4 of FIG. 3, of the combustion liner of FIG. 3, according to an embodiment of the present disclosure.

FIGS. 3 to 8 illustrate a combustion liner 204 that may be employed in the combustor 100 as the combustion liner 104 as described in FIG. 2. Referring first to FIGS. 3 and 4, the combustion liner 204 includes a forward section 220, also referred to as an upstream section 220, and an aft section 222, also referred to as a downstream section 222. The combustion liner 204 includes an outer liner 210 and an inner liner 212. A plurality of fuel nozzle assemblies 224 are spaced circumferentially around the engine centerline 12. The plurality of fuel nozzle assemblies 224 are illustrated in FIG. 4 as dashed circles to facilitate understanding of the circumferential location of the fuel nozzle assemblies 224. Their structure, however, is as described previously herein.

Figure 5:
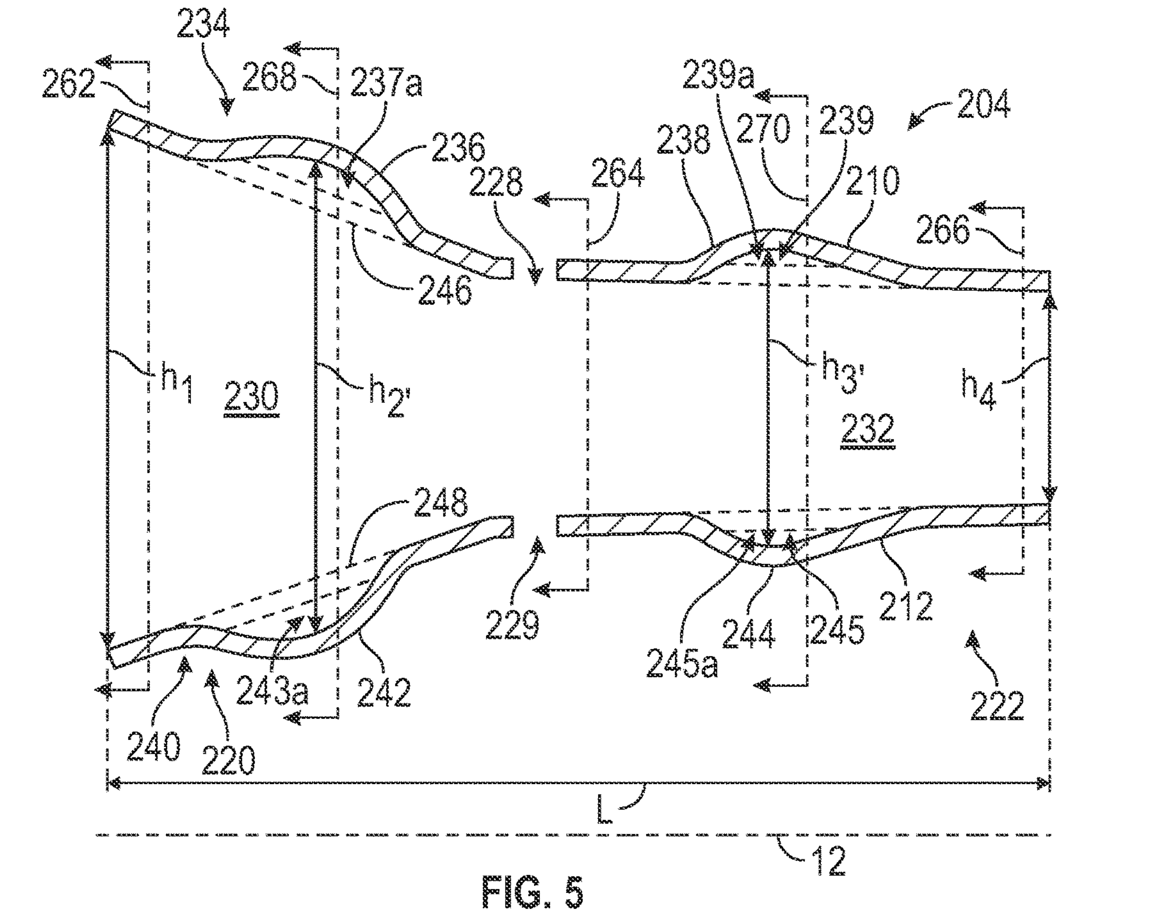
FIG. 5 illustrates a schematic, cross-sectional view, taken along line 5-5 of FIG. 4, of the combustion liner of FIG. 3, according to an embodiment of the present disclosure.
Figure 6:
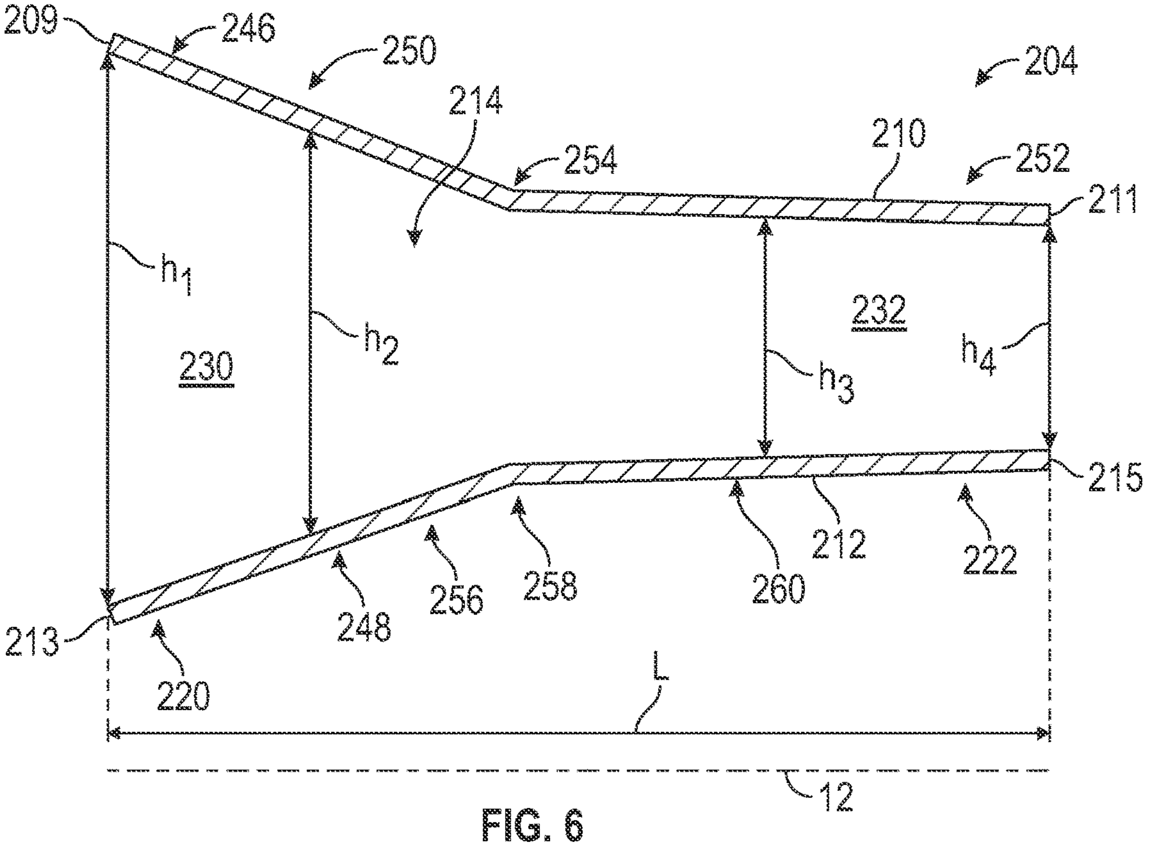
FIG. 6 illustrates a schematic, cross-sectional view, taken along line 6-6 of FIG. 4, of the combustion liner of FIG. 3, according to an embodiment of the present disclosure.

The combustion liner 204 has a converging liner profile. That is, the outer liner 210 and the inner liner 212 converge radially towards each other. Referring to FIGS. 5 and 6, the outer liner 210 converges radially inward with respect to the engine centerline 12 from a forwardmost end 209 toward an aftmost end 211. A first section 250 may converge radially inward from the forwardmost end 209 to an intermediate point 254 and a second section 252 may converge radially inward from the intermediate point 254 to the aftmost end 211. The first section 250 may converge radially inward along the axial length of the first section 250 and the second section 252 may converge radially inward along the axial length of the second section 252. The converging radially inward of the outer liner 210 forms a first outer liner profile 246. A second outer liner profile 234 is formed along an axis through the protrusions, as will be described to follow. The second outer liner profile 234 converges radially inward from the forwardmost end 209 to the aftmost end 211.

The inner liner 212 converges radially outward with respect to the engine centerline 12 from a forwardmost end 213 toward an aftmost end 215. A first section 256 may converge radially outward from the forwardmost end 213 to an intermediate point 258 and a second section 260 may converge radially outward from the intermediate point 258 to the aftmost end 215. The first section 256 may converge radially outward along the axial length of the first section 256 and the second section 260 may converge radially outward along the axial length of the second section 260. The converging radially outward of the inner liner 212 forms a first inner liner profile 248. A second inner liner profile 240 is formed along an axis through the protrusions, as will be described to follow. The second inner liner profile 240 converges radially outward from the forwardmost end 213 to the aftmost end 215.

Accordingly, as shown in FIGS. 5 and 6, the second outer liner profile 234 and the first outer liner profile 246 form the outer liner 210. The second inner liner profile 240 and the first inner liner profile 248 form the inner liner 212.

Referring to FIGS. 3, 4, and 5, the outer liner 210 includes a first plurality of outer liner protrusions 236 and a second plurality of outer liner protrusions 238. Each of the first plurality of outer liner protrusions 236 and the second plurality of outer liner protrusions 238 may be formed as circumferential rows of protrusions. The first plurality of outer liner protrusions 236 and the second plurality of outer liner protrusions 238 extend radially away from the outer liner 210 and radially outward from the engine centerline 12 to define, respectively, a first plurality of outer liner dimples 237 and a second plurality of outer liner dimples 239. The first plurality of outer liner dimples 237 and the second plurality of outer liner dimples 239 are present as cavities on the internal side (e.g., the side facing the combustion chamber 214) of the combustor. Each of the first plurality of outer liner dimples 237 and the second plurality of outer liner dimples 239 may be formed as circumferential rows of dimples. The first plurality of outer liner protrusions 236 and the second plurality of outer liner protrusions 238, and, thus, the first plurality of outer liner dimples 237 and a second plurality of outer liner dimples 239 are aligned circumferentially with the plurality of fuel nozzle assemblies 224.

The outer liner 210 includes a plurality of outer liner dilution holes 228. The plurality of outer liner dilution holes 228 are circumferentially aligned with each of the first plurality of outer liner protrusions 236 and the second plurality of outer liner protrusions 238. Each of the plurality of outer liner dilution holes 228, the first plurality of outer liner protrusions 236, and the second plurality of outer liner protrusions 238 extend circumferentially around the outer liner 210 about the engine centerline 12. The first plurality of outer liner protrusions 236 form the first plurality of outer liner dimples 237, as shown in FIGS. 4 and 5. The second plurality of outer liner protrusions 238 form the second plurality of outer liner dimples 239, as shown in FIG. 5. The first plurality of outer liner protrusions 236 and the second plurality of outer liner protrusions 238, and, thus, the first plurality of outer liner dimples 237 and the second plurality of outer liner dimples 239, respectively, are circumferentially aligned. Although, misaligned protrusions or dimples are contemplated. The first plurality of outer liner protrusions 236 and the second plurality of outer liner protrusions 238 may be uniformly spaced about the engine centerline 12. The first plurality of outer liner protrusions 236 and the second plurality of outer liner protrusions 238 may be randomly spaced about the engine centerline 12. Although six of each of the first plurality of outer liner protrusions 236 and the second plurality of outer liner protrusions 238 are depicted, more or fewer may be provided.

With continued reference to FIGS. 3, 4, and 5, the first plurality of outer liner protrusions 236 and the second plurality of outer liner protrusions 238, and, thus, the first plurality of outer liner dimples 237 and the second plurality of outer liner dimples 239, respectively, form the second outer liner profile 234. Each outer liner protrusion 236 of the first plurality of outer liner protrusions 236 forms a dimple angle $\varnothing_O$. The dimple angle $\varnothing_O$ represents the angle spanned by each dimple of the outer liner. The dimple angle $\varnothing_O$ is defined between a radial axis $D_{O1}$ extending from the engine centerline 12 through the starting edge of one outer liner protrusion 236 of the first plurality of outer liner protrusions 236 and a radial axis $D_{O2}$ extending from the engine centerline 12 through the terminal edge of the same outer liner protrusion 236 of the first plurality of outer liner protrusions 236. A dimple angle $\varnothing_O$, though not depicted for clarity, may similarly be defined for each outer liner protrusion 238 of the second plurality of outer liner protrusions 238. The dimple angle $\varnothing_O$ of each of the first plurality of outer liner protrusions 236 may be the same as or different than the dimple angle $\varnothing_O$ of each of the second plurality of outer liner protrusions 238. The dimple angle $\varnothing_O$ of each individual protrusion of the first plurality of outer liner protrusions 236 or the second plurality of outer liner protrusions 238, or both, may be the same as or different from other individual protrusions.

Referring to FIGS. 4 and 5, the inner liner 212 includes a first plurality of inner liner protrusions 242 and a second plurality of inner liner protrusions 244. Each of the first plurality of inner liner protrusions 242 and the second plurality of inner liner protrusions 244 is formed as circumferential rows of protrusions. The first plurality of inner liner protrusions 242 and the second plurality of inner liner protrusions 244 extend radially away from the inner liner 212 and radially inward toward the engine centerline 12 to define, respectively, a first plurality of inner liner dimples 243 and a second plurality of inner liner dimples 245. The first plurality of inner liner dimples 243 and the second plurality of inner liner dimples 245 are present as cavities on the internal side (e.g., the side facing the combustion chamber 214) of the combustor. Each of the first plurality of inner liner dimples 243 and the second plurality of inner liner dimples 245 are formed as circumferential rows of dimples. The first plurality of inner liner protrusions 242 and the second plurality of inner liner protrusions 244, and, thus, the first plurality of inner liner dimples 243 and the second plurality of inner liner dimples 245 are aligned circumferentially with the plurality of fuel nozzle assemblies 224.

The inner liner 212 includes a plurality of inner liner dilution holes 229. The plurality of inner liner dilution holes 229 are circumferentially aligned with each of the first plurality of inner liner protrusions 242 and the second plurality of inner liner protrusions 244. Each of the plurality of inner liner dilution holes 229, the first plurality of inner liner protrusions 242, and the second plurality of inner liner protrusions 244 extend circumferentially around the inner liner 212 about the engine centerline 12. The first plurality of inner liner protrusions 242 form the first plurality of inner liner dimples 243, as shown in FIGS. 4 and 5. The second plurality of inner liner protrusions 244 form the second plurality of inner liner dimples 245, as shown in FIG. 5. The first plurality of inner liner protrusions 242 and the second plurality of inner liner protrusions 244, and, thus, the first plurality of inner liner dimples 243 and the second plurality of inner liner dimples 245, respectively, are circumferentially aligned. Although, misaligned protrusions or dimples are contemplated. The first plurality of inner liner protrusions 242 and the second plurality of inner liner protrusions 244 may be uniformly spaced about the engine centerline 12. The first plurality of inner liner protrusions 242 and the second plurality of inner liner protrusions 244 may be randomly spaced about the engine centerline 12. Although six of each of the first plurality of inner liner protrusions 242 and the second plurality of inner liner protrusions 244 are depicted, more or fewer may be provided.

With continued reference to FIGS. 4 and 5, the first plurality of inner liner protrusions 242 and the second plurality of inner liner protrusions 244, and, thus, the first plurality of inner liner dimples 243 and the second plurality of inner liner dimples 245, respectively, form the second inner liner profile 240. Each inner liner protrusion 242 of the first plurality of inner liner protrusions 242 forms a dimple angle $\O_I$. The dimple angle $\O_I$ represents the angle spanned by each dimple of the inner liner. The dimple angle $\O_I$ defined between a radial axis $D_{I1}$ extending from the engine centerline 12 through the starting edge of one inner liner protrusion 242 of the first plurality of inner liner protrusions 242 and a radial axis $D_{I2}$ extending from the engine centerline 12 through the terminal edge of the same inner liner protrusion 242 of the first plurality of inner liner protrusions 242. A dimple angle $\O_I$, though not depicted for clarity, may similarly be defined for each inner liner protrusion 244 of the second plurality of inner liner protrusions 244. The dimple angle $\O_I$ of each of the first plurality of inner liner protrusions 242 may be the same as or different than the dimple angle $\O_I$ of each of the second plurality of inner liner protrusions 244. The dimple angle $\O_I$ of each individual protrusion of the first plurality of inner liner protrusions 242 or the second plurality of inner liner protrusions 244, or both, may be the same as or different from other individual protrusions.

As illustrated in FIGS. 4 and 5, the first plurality of outer liner protrusions 236 are circumferentially and axially aligned with the first plurality of inner liner protrusions 242. The second plurality of outer liner protrusions 238 are circumferentially and axially aligned with the second plurality of inner liner protrusions 244. The plurality of outer liner dilution holes 228 are circumferentially and axially aligned with the plurality of inner liner dilution holes 229. A primary combustion zone 230 is located upstream of the plurality of outer liner dilution holes 228 and the plurality of inner liner dilution holes 229. A post dilution zone 232 is located downstream of the plurality of outer liner dilution holes 228 and the plurality of inner liner dilution holes 229. The primary combustion zone 230 and the post dilution zone 232 form the combustion chamber 214.

The first plurality of outer liner dimples 237 and the first plurality of outer liner protrusions 236 are located at the upstream section 220 in the primary combustion zone 230 and upstream of the plurality of outer liner dilution holes 228. The second plurality of outer liner dimples 239 and the second plurality of outer liner protrusions 238 are located at the downstream section 222 in the post dilution zone 232 and downstream of the plurality of outer liner dilution holes 228. The first plurality of inner liner dimples 243 and the first plurality of inner liner protrusions 242 are located at the upstream section 220 in the primary combustion zone 230 and upstream of the plurality of inner liner dilution holes 229. The second plurality of inner liner dimples 245 and the second plurality of inner liner protrusions 244 are located at the downstream section 222 in the post dilution zone 232 and downstream of the plurality of inner liner dilution holes 229.

FIG. 4 further illustrates an angle θ defined between a radial axis $A_{FN1}$ extending from the engine centerline 12 through a centerline of a first fuel nozzle assembly 224 and a radial axis $A_{FN2}$ extending from the engine centerline 12 through a centerline of a second, adjacent fuel nozzle assembly 224.

Referring to FIGS. 5 and 6, the combustion liner 204 includes a length L defined between the forwardmost ends 209 and 213 (which are axially aligned) and the aftmost ends 211 and 215 (which are axially aligned). A first height $h_1$ is defined as the radial distance between the forwardmost end 209 and the forwardmost end 213. The first height $h_1$ is defined at the combustor inlet.

A first dimple height $h_{2'}$ is defined as the radial distance between a maximum height of a dimple 237*a* of the first plurality of outer liner dimples 237 and a maximum height of a dimple 243*a* (circumferentially aligned with the dimple 237*a*) of the first plurality of inner liner dimples 243. The first dimple height $h_{2'}$, thus, is also defined as the radial distance between the second outer liner profile 234 and the second inner liner profile 240 at a maximum height of each of the dimples 237*a* and 243*a*, that is, at the location of the circumferent of the section line 5-5 in FIG. 4. The first dimple height $h_{2'}$ defines the radial height of the combustor with dimples in the forward section 220 (e.g., in the primary combustion zone 230).

A second height $h_2$ is defined as the radial distance between the first outer liner profile 246 and the first inner liner profile 248 at the same axial location as the first dimple height $h_{2'}$ and at a circumferential location where no outer liner protrusion 236, no outer liner dimple 237, no inner liner protrusion 242, and no inner liner dimple 243 are present. That is, at the location of the circumference of the section line 6-6 in FIG. 4. Therefore, the second height $h_{2'}$ defines a radial height of the combustor without dimples in the forward section 220 (e.g., in the primary combustion zone 230).

A second dimple height $h_{3'}$ is defined as the radial distance between a maximum height of a dimple 239*a* of the second plurality of outer liner dimples 239 and a maximum height of a dimple 245*a* (circumferentially aligned with the dimple 239*a*) of the second plurality of inner liner dimples 245. The second dimple height $h_{3'}$, thus, is also defined as the radial distance between the second outer liner profile 234 and the second inner profile 240 at a maximum height of each of the dimples 239*a* and 245*a*, that is, at the location of the circumferent of the section line 5-5 in FIG. 4. The second dimple height $h_{3'}$ defines the radial height of the combustor with dimples in the aft section 222 (e.g., in the post dilution zone 232).

A third height $h_3$ is defined as the radial distance between the first outer liner profile 246 and the first inner liner profile 248 at the same axial location as the second dimple height $h_{3'}$ and at a circumferential location where no outer liner protrusion 238, no outer liner dimple 239, no inner liner protrusion 244, and no inner liner protrusion 245 are present. That is, at the location of the circumference of the section line 6-6 in FIG. 4. Therefore, the third height $h_3$ defines a radial height of the combustor without dimples in the aft section 222 (e.g., in the post dilution zone 232).

A fourth height $h_4$ is defined as the radial distance between the aftmost end 211 and the aftmost end 215. The fourth height $h_4$ is defined at the combustor exit.

Figure 7:
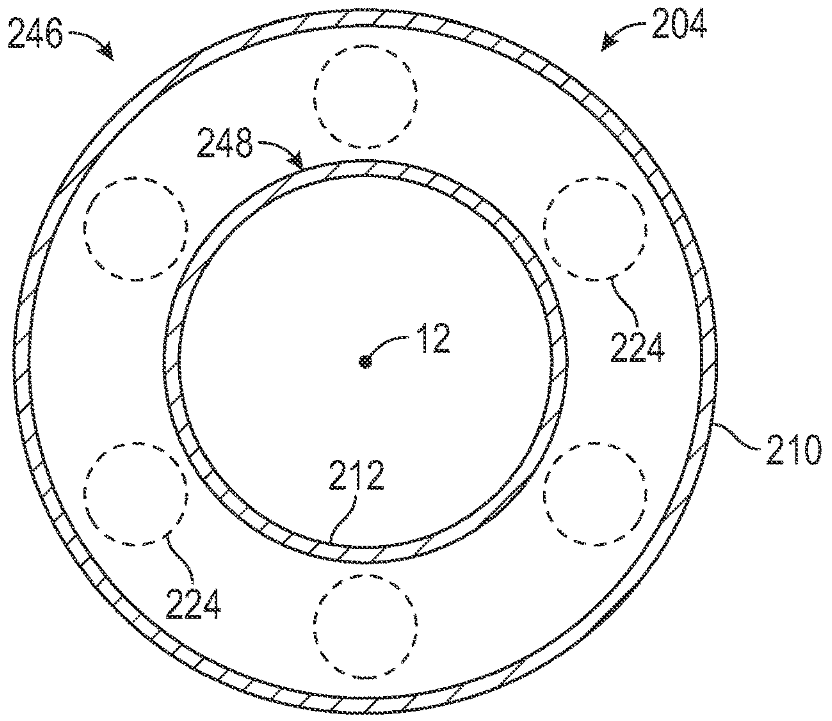
FIG. 7 illustrates a schematic, cross-sectional view, taken along the plane 262 of FIG. 5, of the combustion liner of FIG. 3, according to an embodiment of the present disclosure.

FIG. 7 illustrates the combustion liner 204 profile taken at a plane 262 in FIG. 5. At plane 262, the profile of the combustion liner 204 is that of the first outer liner profile 246 and the first inner liner profile 248 with no dimples and no protrusions present. A similar profile viewed at a plane 264 of FIG. 5 will appear with the same profile as FIG. 7, but relatively smaller than shown in FIG. 7 as the combustion liner 204 converges. A similar profile viewed at a plane 266 of FIG. 5 will appear with the same profile as FIG. 7, but relatively smaller than shown in FIG. 7 as the combustion liner 204 converges. The profile viewed at plane 266 and the profile viewed at plane 264 will appear relatively similar in size as the combustion liner 204 converges between the planes 264 and 266 by a lesser degree in the second section 260 (FIG. 6) than in the first section 250 (FIG. 6). A plane 268 in FIG. 5 is taken in the primary combustion zone 230, the plane 264 is taken in the dilution zone, and a plane 270 in FIG. 5 is taken in the post dilution zone 232.

Figure 8:
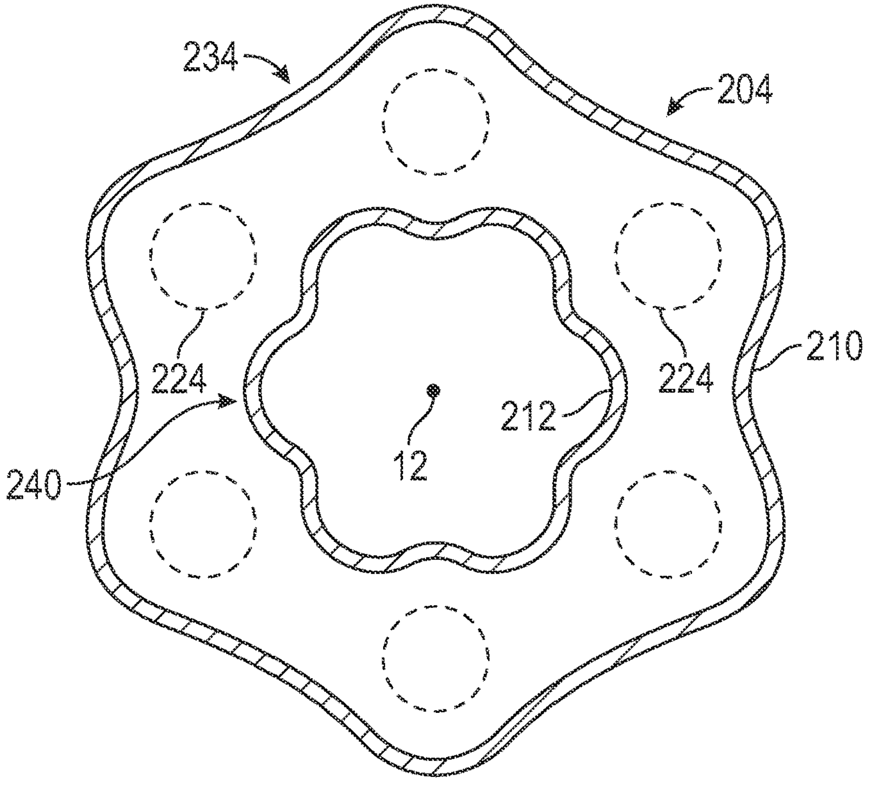
FIG. 8 illustrates a schematic, cross-sectional view, taken along the plane 268 of FIG. 5, of the combustion liner of FIG. 3, according to an embodiment of the present disclosure.
Figure 9:
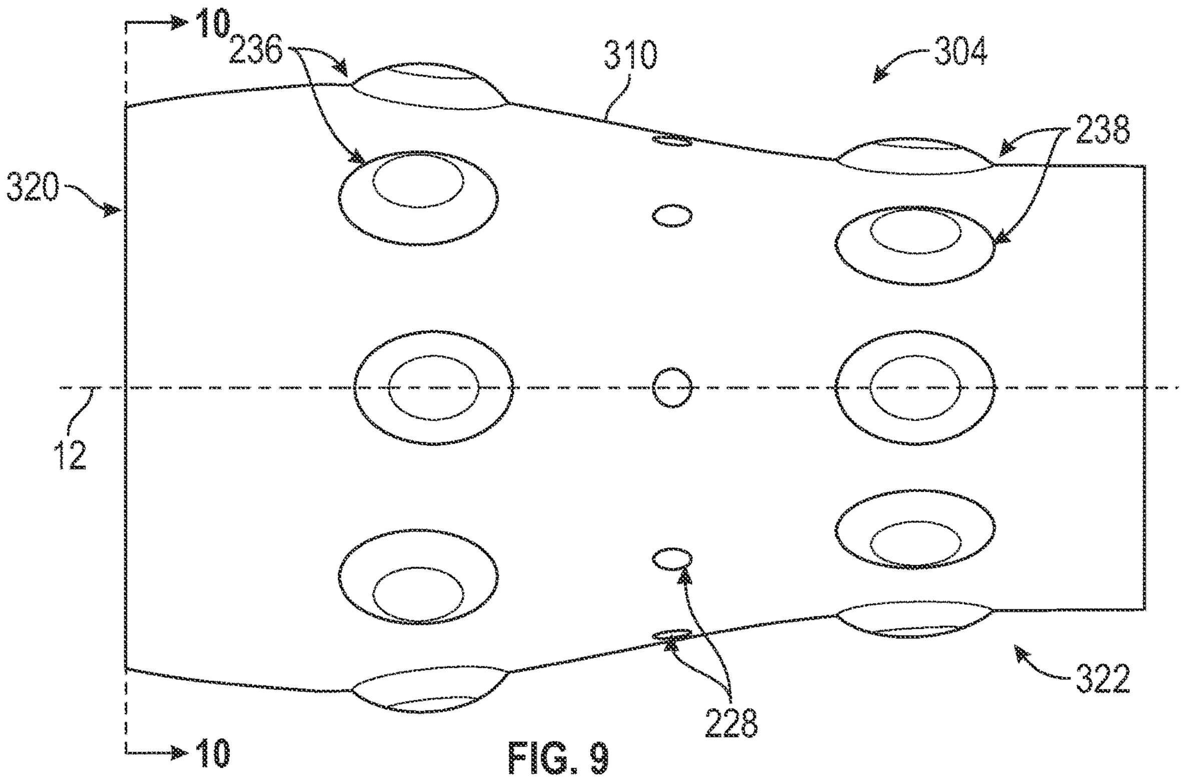
FIG. 9 illustrates a schematic, side view of a combustion liner for a combustor, for the engine of FIG. 1, according to an embodiment of the present disclosure.
Figure 10:
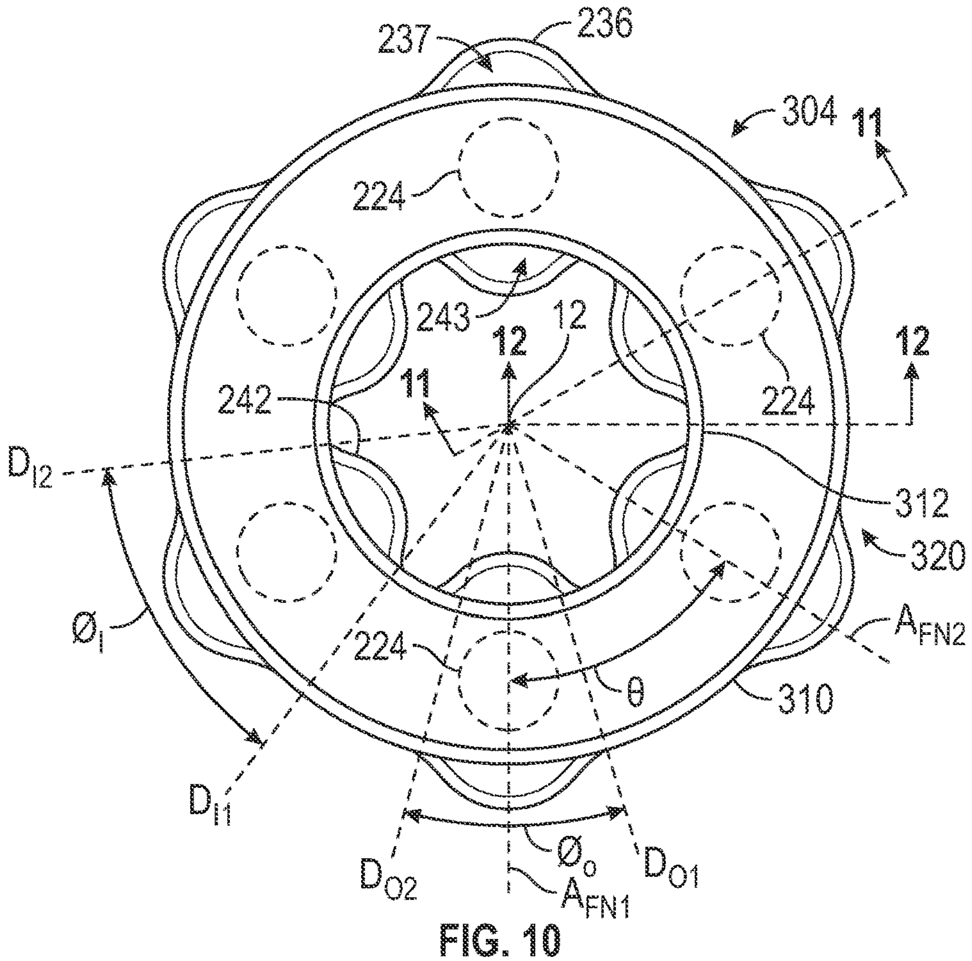
FIG. 10 illustrates a schematic, end view, taken along line 10-10 of FIG. 9, of the combustion liner of FIG. 9, according to an embodiment of the present disclosure.

FIG. 8 illustrates the combustion liner 204 profile taken at plane 268. At plane 268, the profile of the combustion liner 204 is that of the second outer liner profile 234 and the second inner liner profile 240 with dimples and protrusions present. A similar profile viewed at plane 270 of FIG. 5 will appear with the same profile as FIG. 8, but relatively smaller than shown in FIG. 8 as the combustion liner 204 converges.

Thus, FIGS. 7 and 8 illustrate that the combustion liner 204 is formed of two profiles, a dimpled profile (e.g., second outer liner profile 234 and second inner liner profile 240) and an undimpled profile (e.g., first outer liner profile 246 and first inner liner profile 248).

FIGS. 9 to 14 illustrate an alternative combustion liner 304. The combustion liner 304 is similar to the combustion liner 204 and like reference numerals indicate like parts. The combustion liner 304 includes an outer liner 310 and an inner liner 312. The combustion liner 304 has an upstream section 320 and a downstream section 322. A primary combustion zone 330 and a post dilution zone 332 define a combustion chamber 314, as described previously. The locations, orientation, and other features of the protrusions and dimples and dilution holes may be the same as with respect to FIGS. 3 to 8. The difference between FIGS. 3 to 8 and FIGS. 9 to 14 may be the nature in which the combustion liner converges.

Figure 11:
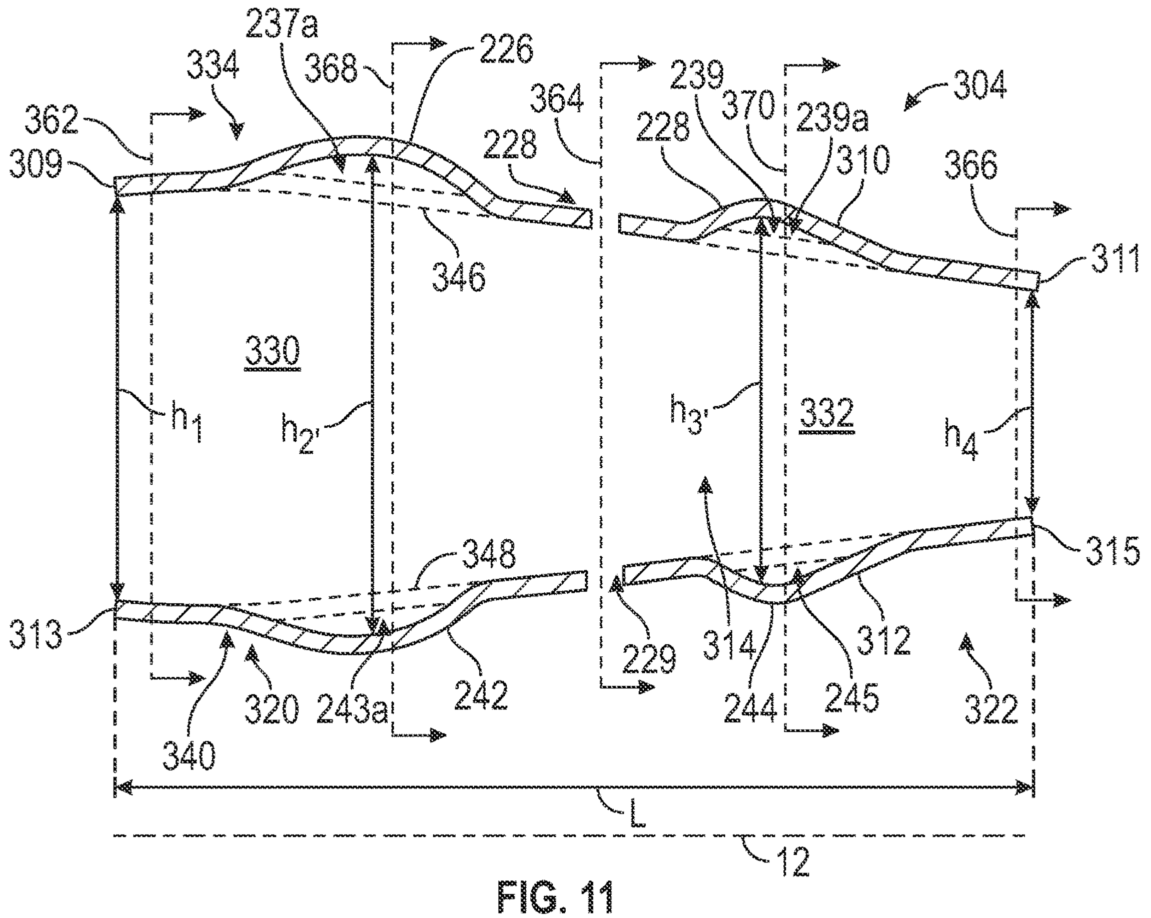
FIG. 11 illustrates a schematic, cross-sectional view, taken along line 11-11 of FIG. 10, of the combustion liner of FIG. 9, according to an embodiment of the present disclosure.
Figure 12:
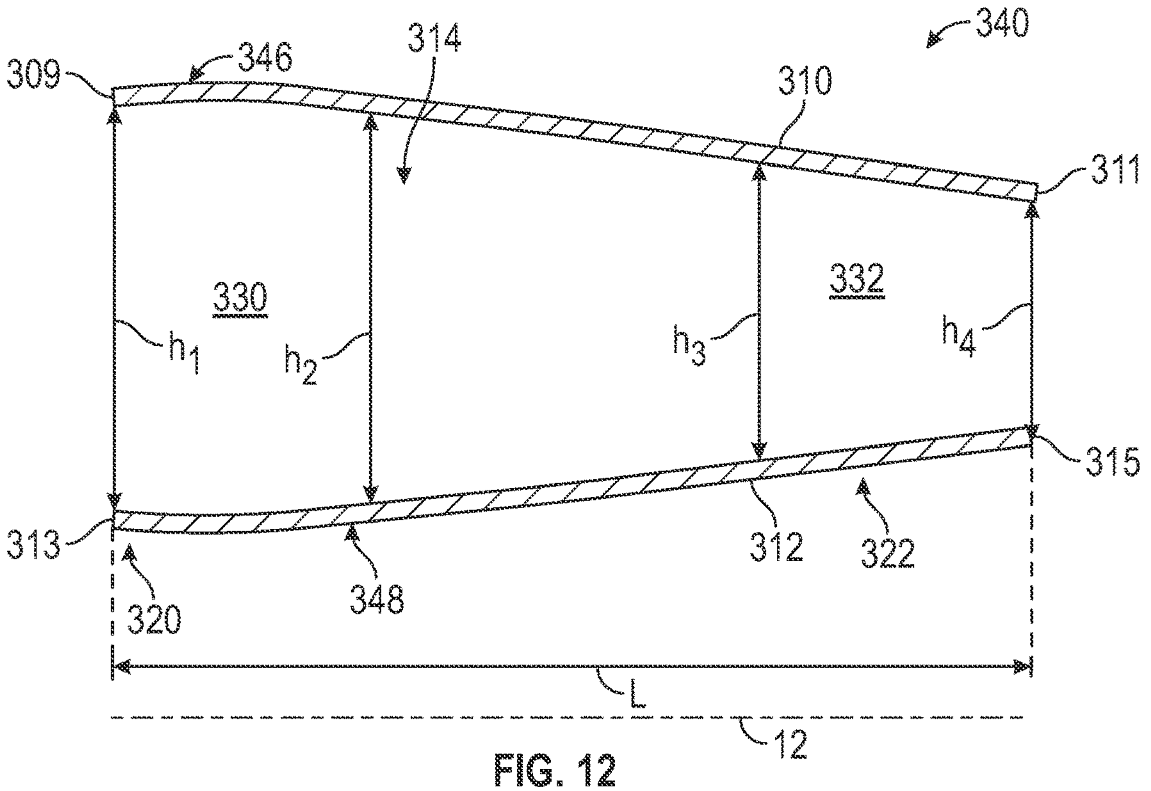
FIG. 12 illustrates a schematic, cross-sectional view, taken along line 12-12 of FIG. 10, of the combustion liner of FIG. 9, according to an embodiment of the present disclosure.

The combustion liner 304 has a continuously converging liner profile. That is, the outer liner 310 and the inner liner 312 converge radially towards each other continuously along the axial length of the outer liner 310 and the inner liner 312. Referring to FIGS. 11 and 12, the outer liner 310 converges radially inward with respect to the engine centerline 12 from a forwardmost end 309 toward an aftmost end 311. The converging of the outer liner 310 forms a first outer liner profile 346. A second outer liner profile 334 is formed along an axis through the protrusions, as described with respect to FIGS. 3 to 8. The second outer liner profile 334 converges radially inward continuously along the axial length of the outer liner 310 from the forwardmost end 309 to the aftmost end 311. The inner liner 312 converges radially outward with respect to the engine centerline 12 continuously along the axial length of the inner liner 312 from a forwardmost end 313 toward an aftmost end 315. The converging of the inner liner 312 forms a first inner liner profile 348. A second inner liner profile 340 is formed along an axis through the protrusions, as described with respect to FIGS. 3 to 8. The second inner liner profile 340 converges radially outward continuously along the axial length of the inner liner 312 from the forwardmost end 313 to the aftmost end 315.

Accordingly, as shown in FIGS. 11 and 12, the second outer liner profile 334 and the first outer liner profile 346 form the outer liner 310. The second inner liner profile 340 and the first inner liner profile 348 form the inner liner 312. The length L and heights $h_1$, $h_2$, $h_3$, $h_4$, $h_{2'}$, and $h_{3'}$ shown in FIGS. 11 and 12 are defined the same as was described with respect to FIGS. 5 and 6 above.

Figure 13:
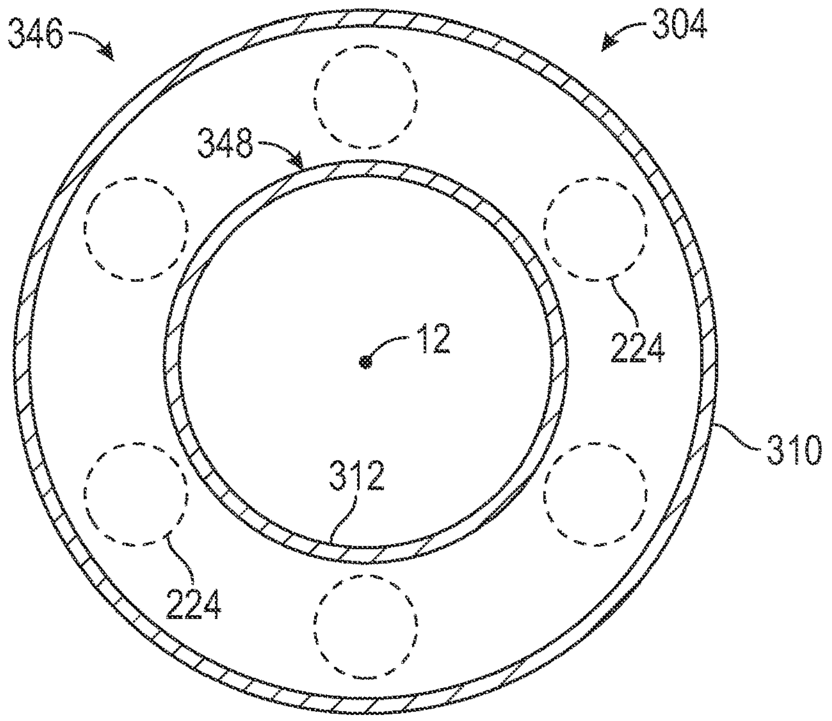
FIG. 13 illustrates a schematic, cross-sectional view, taken along the plane 362 of FIG. 11, of the combustion liner of FIG. 9, according to an embodiment of the present disclosure.

FIG. 13 illustrates the combustion liner 304 profile taken at a plane 362 in FIG. 11. At plane 362, the profile of the combustion liner 304 is that of the first outer liner profile 346 and the first inner liner profile 348 with no dimples and no protrusions present. A similar profile viewed at a plane 364 of FIG. 11 will appear with the same profile as FIG. 13, but relatively smaller than shown in FIG. 13 as the combustion liner 304 converges. A similar profile viewed at a plane 366 of FIG. 11 will appear with the same profile as FIG. 13, but relatively smaller than shown in FIG. 13 and relatively smaller than the profile at plane 364 as the combustion liner 304 continuously converges.

Figure 14:
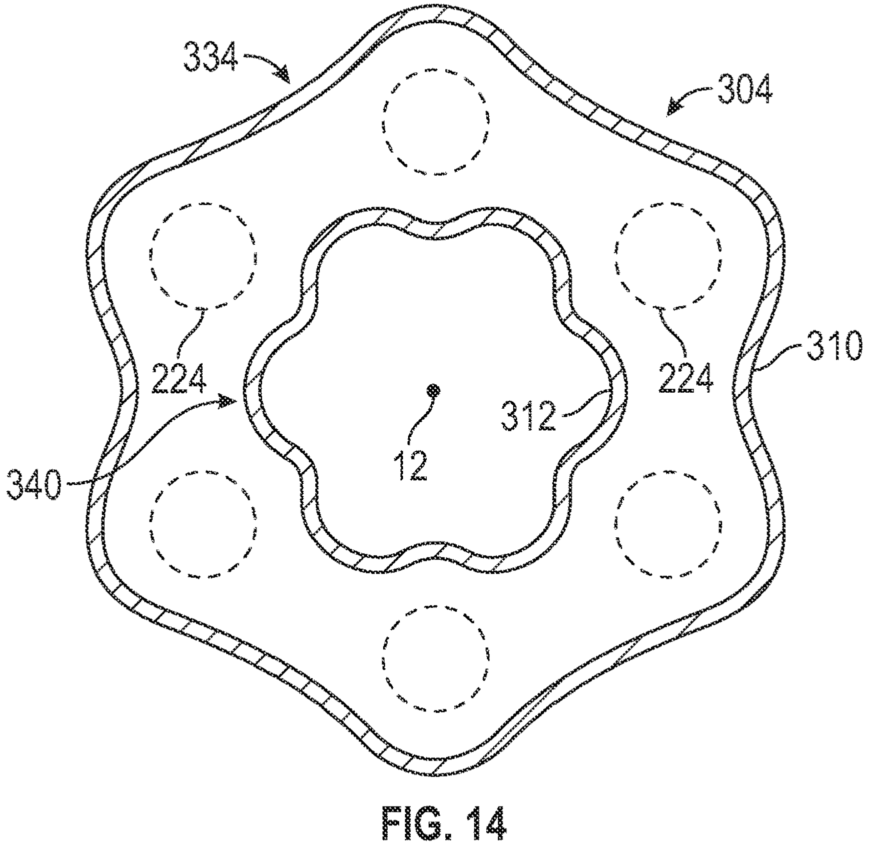
FIG. 14 illustrates a schematic, cross-sectional view, taken along the plane 368 of FIG. 11, of the combustion liner of FIG. 9, according to an embodiment of the present disclosure.
Figure 15:
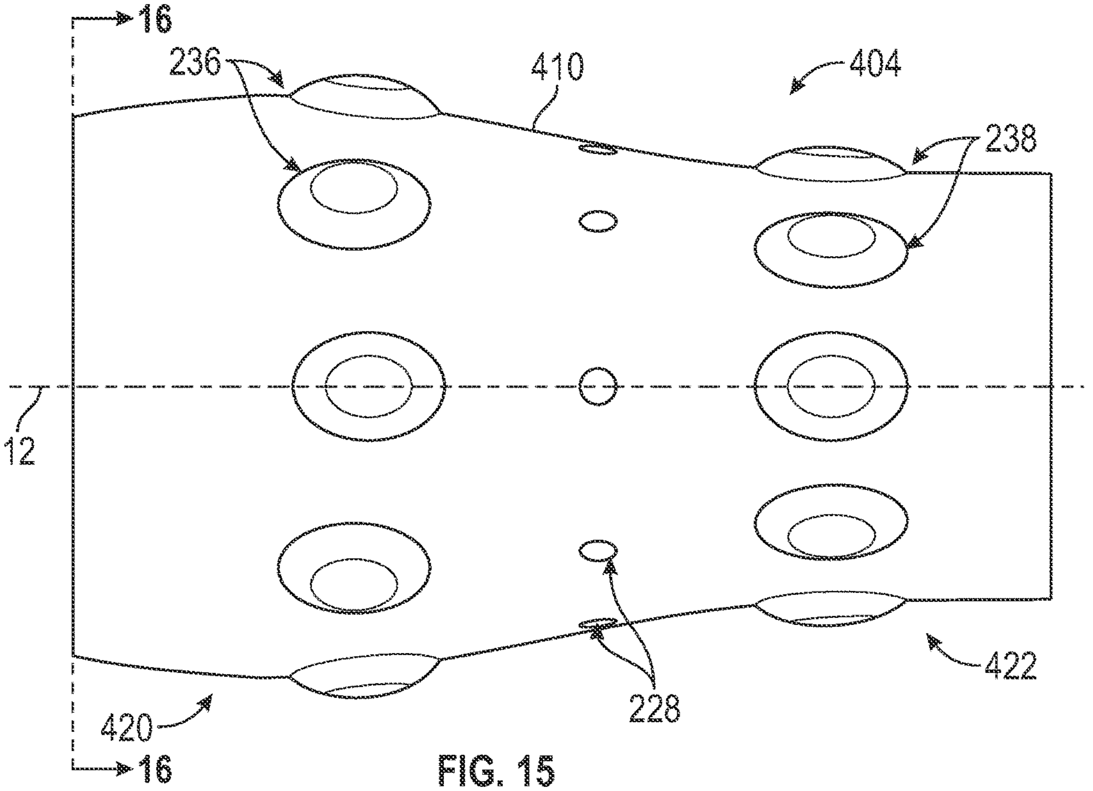
FIG. 15 illustrates a schematic, side view of a combustion liner for a combustor, for the engine of FIG. 1, according to an embodiment of the present disclosure.
Figure 16:
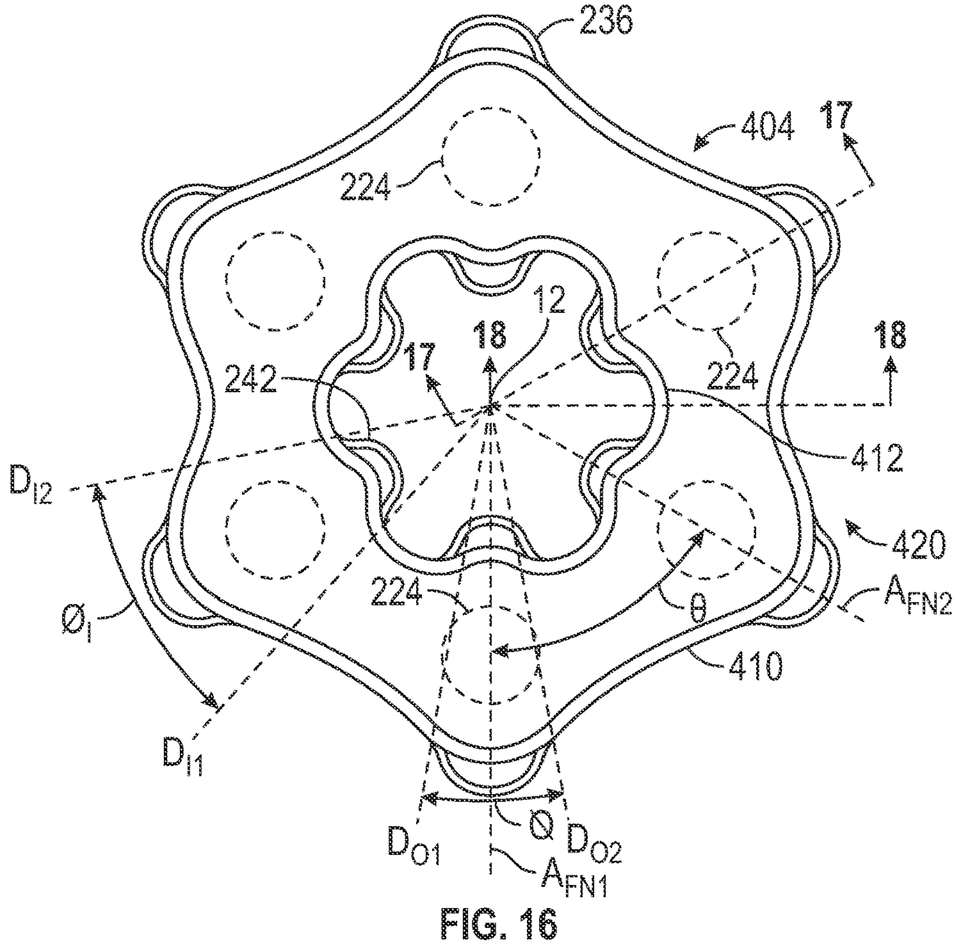
FIG. 16 illustrates a schematic, end view, taken along line 16-16 of FIG. 15, of the combustion liner of FIG. 15, according to an embodiment of the present disclosure.

FIG. 14 illustrates the combustion liner 304 profile taken at a plane 368. At plane 368, the profile of the combustion liner 304 is that of the second outer liner profile 334 and the second inner liner profile 340 with dimples and protrusions present. A similar profile viewed at a plane 370 of FIG. 11 will appear with the same profile as FIG. 14, but relatively smaller than shown in FIG. 14 as the combustion liner 304 converges.

Thus, FIGS. 13 and 14 illustrate that the combustion liner 304 is formed of two profiles, a dimpled profile (e.g., the second outer liner profile 334 and the second inner liner profile 340) and an undimpled profile (e.g., the first outer liner profile 346 and the first inner liner profile 348).

FIGS. 15 to 18 illustrate an alternative combustion liner 404. The combustion liner 404 is similar to the combustion liner 204 and like reference numerals indicate like parts. The combustion liner 404 includes an outer liner 410 and an inner liner 412. The combustion liner 404 has an upstream section 420 and a downstream section 422. A primary combustion zone 430 and a post dilution zone 432 define a combustion chamber 414, as described previously. The locations, orientation, and other features of the protrusions and dimples and dilution holes may be the same as with respect to FIGS. 3 to 8. The difference between FIGS. 3 to 8 and FIGS. 15 to 18 may be the nature of the combustion liner profile. In FIGS. 15 to 18, the combustion liner 404 has a three-dimensional profile. That is, in addition to converging along the axial length of the combustion liner 404, the combustion liner 404 also has a profile that changes along the circumference and along the radius of the combustion liner 404, separate from and in addition to the protrusions and dimples previously described herein.

Figure 17:
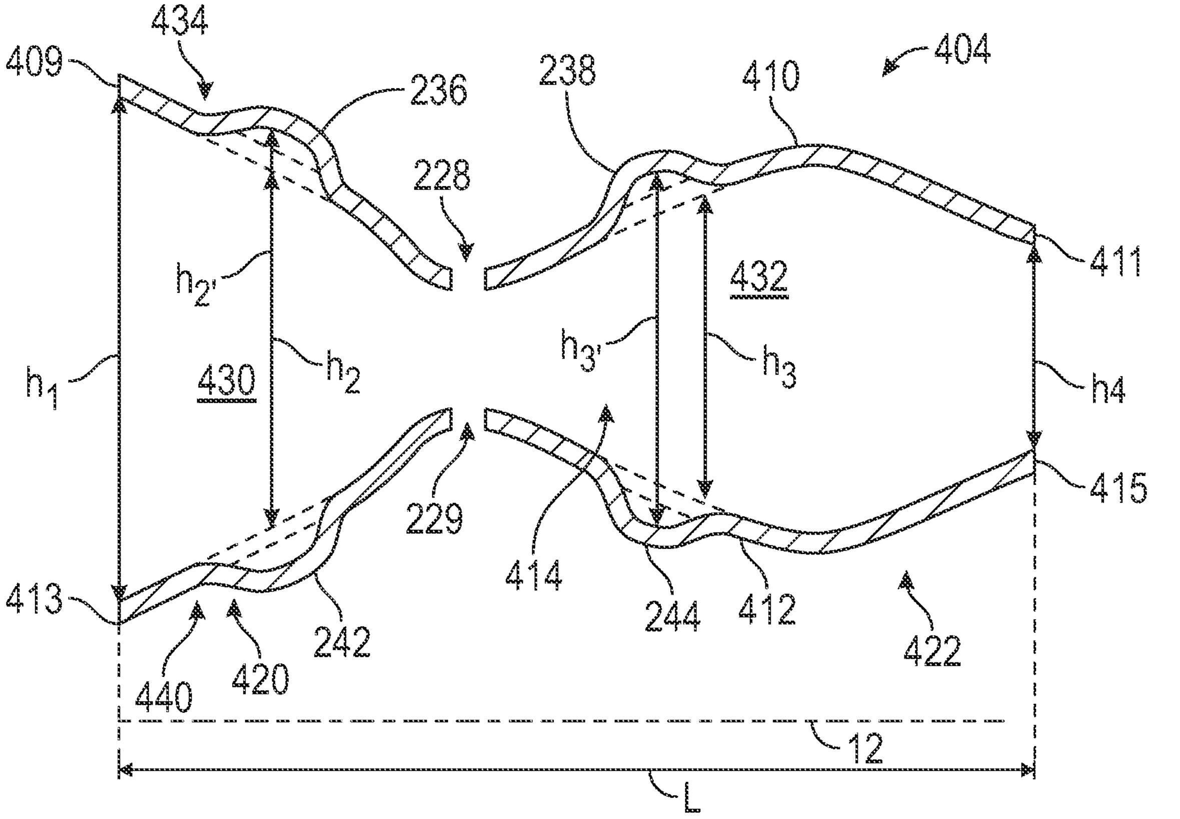
FIG. 17 illustrates a schematic, cross-sectional view, taken along line 17-17 of FIG. 16, of the combustion liner of FIG. 15, according to an embodiment of the present disclosure.
Figure 18:
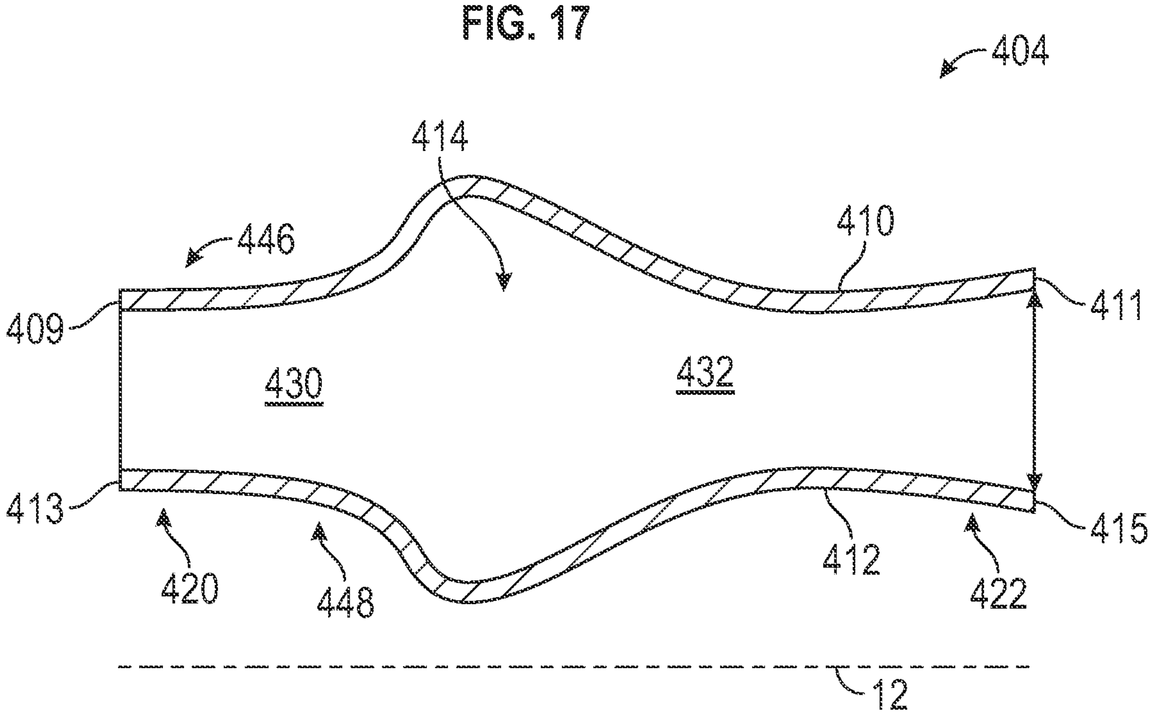
FIG. 18 illustrates a schematic, cross-sectional view, taken along line 18-18 of FIG. 16, of the combustion liner of FIG. 15, according to an embodiment of the present disclosure.

The combustion liner 404 converges and diverges along the axial length. That is, the outer liner 410 and the inner liner 412 converge radially towards each other and radially away from each other in different axial locations. Referring to FIGS. 17 and 18, the outer liner 410 includes a forwardmost end 409 and an aftmost end 411. The inner liner 412 includes a forwardmost end 413 and an aftmost end 415. The profile of the outer liner 410, as shown in FIGS. 17 and 18, may converge toward the engine centerline 12 and diverge away from the engine centerline 12 at different axial locations and different circumferential locations along the outer liner 410. Thus, the outer liner 410 has a three-dimensional contouring to form a first outer liner profile 446. In addition to the three-dimensional contouring of the outer liner 410, the protrusions and dimples previously described may be included to provide a second outer liner profile 434.

The profile of the inner liner 412, as shown in FIGS. 17 and 18, may converge toward the engine centerline 12 and diverge away from the engine centerline 12 at different axial locations and different circumferential locations along the inner liner 412. Thus, the inner liner 412 has a three-dimensional contouring to form a first inner liner profile 448. In addition to the three-dimensional contouring of the inner liner 412, the protrusions and dimples previously described may be included to provide a second inner liner profile 440.

Accordingly, as shown in FIGS. 15 to 18, the second outer liner profile 434 and the first outer liner profile 446 form the outer liner 410. The second inner liner profile 440 and the first inner liner profile 448 form the inner liner 412. The length L and heights $h_1$, $h_2$, $h_3$, $h_4$, $h_{2'}$, and $h_{3'}$ shown in FIGS. 17 and 18 are defined the same as was described with respect to FIGS. 5 and 6 above.

Accordingly, FIGS. 3 to 14 illustrate combustion liners that have constant liner diameters across the circumference, when considered at a location of the combustion liner without dimples (e.g., as shown in FIGS. 7 and 13). The combustion liner of FIGS. 15 to 18, on the contrary, has a variable liner diameter across the circumference, when considered at a location of the combustion liner without dimples.

Figure 19:
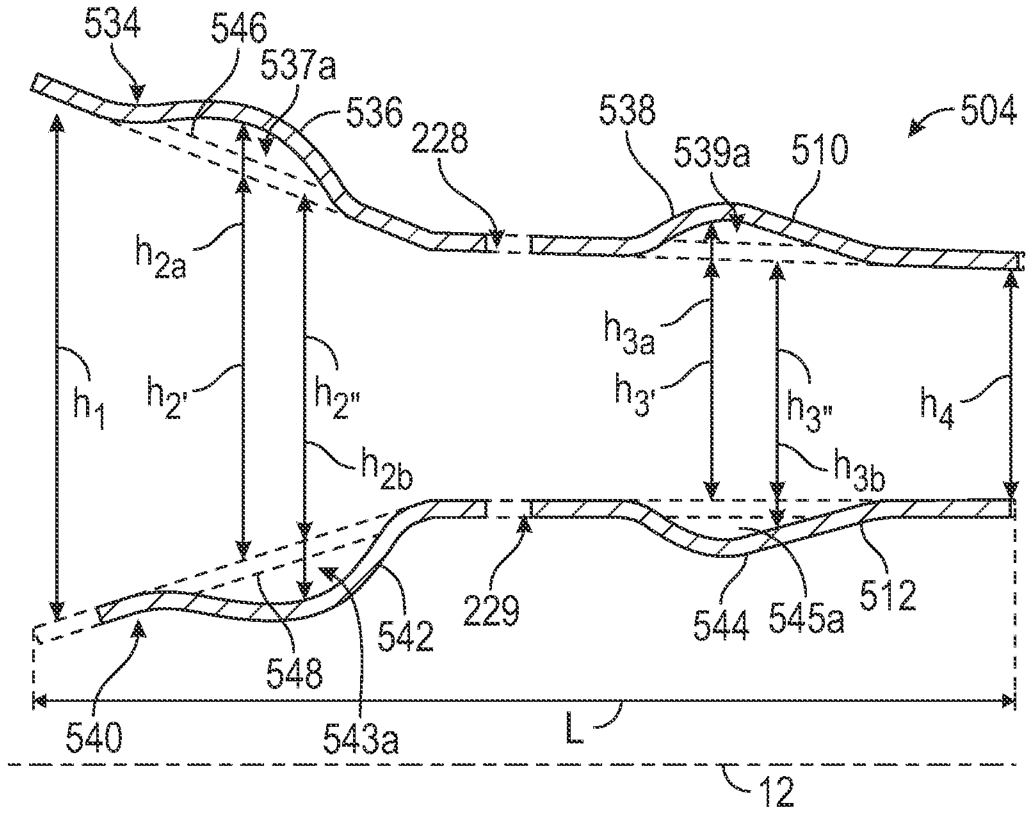
FIG. 19 illustrates a schematic, cross-sectional view, taken along line a similar line to line 5-5 of FIG. 4, of a combustion liner for a combustor for the engine of FIG. 1, according to an embodiment of the present disclosure.

FIG. 19 illustrates an alternative combustion liner 504. The combustion liner 504 is similar to the combustion liner 204 and like reference numerals indicate like parts. The difference between the combustion liner 504 and the combustion liner 204 is that the protrusions and dimples of the outer liner may be axially offset as compared to the protrusions and dimples of the inner liner. Other examples where the dimples are circumferentially offset are also contemplated.

For example, an outer liner 510 of the combustion liner 504 may have a first outer liner profile 546 the same as the first outer liner profile 246 of FIG. 5. The outer liner 510 may have a second outer liner profile 534 formed of a first plurality of outer liner protrusions 536 and a second plurality of outer liner protrusions 538. An inner liner 512 of the combustion liner 504 may have a first inner liner profile 548 the same as the first inner liner profile 248 of FIG. 5. The inner liner 512 may have a second inner liner profile 540 formed of a first plurality of inner liner protrusions 542 and a second plurality of inner liner protrusions 544.

The first height $h_1$, the fourth height $h_4$, and the length L may be defined as described previously. In FIG. 19, a first outer liner dimple height $h_{2'}$ is defined as the radial distance between a maximum height of a dimple 537*a* of the first plurality of outer liner dimples and an inner diameter of the first inner liner profile 548 at the same axial location. A first inner liner dimple height $h_{2''}$ is defined as the radial distance between a maximum height of a dimple 543*a* of the first plurality of inner liner dimples and an inner diameter of the first outer liner profile 546 at the same axial location.

Likewise, a second outer liner dimple height $h_{3'}$ is defined as the radial distance between a maximum height of a dimple 539*a* of the first plurality of outer liner dimples and an inner diameter of the first inner liner profile 548 at the same axial location. A second inner liner dimple height $h_{3''}$ is defined as the radial distance between a maximum height of a dimple 545*a* of the first plurality of inner liner dimples and an inner diameter of the first outer liner profile 546 at the same axial location.

An outer liner second height $h_{2a}$, is defined as the radial distance between the first outer liner profile 546 and the first inner liner profile 548 at the same axial location as the first outer liner dimple height $h_{2'}$ and at a circumferential location where no outer liner protrusion 536, no outer liner dimple 537*a*, no inner liner protrusion 542, and no inner liner dimple 543*a* are present. Therefore, the outer liner second height $h_{2a}$ defines a radial height of the combustion liner 504 in the primary combustion zone where no dimples are present. An inner liner second height $h_{2b}$ is defined as the radial distance between the first outer liner profile 546 and the first inner liner profile 548 at the same axial location as the first inner liner dimple height $h^{2''}$ and at a circumferential location where no outer liner protrusion 536, no outer liner dimple 537*a*, no inner liner protrusion 542, and no inner liner dimple 543*a* are present. Therefore, the inner liner second height $h_{2b}$ defines a radial height of the combustion liner 504 in the primary combustion zone where no dimples are present.

An outer liner third height $h_{3a}$ is defined as the radial distance between the first outer liner profile 546 and the first inner liner profile 548 at the same axial location as the second outer liner dimple height $h_{3'}$ and at a circumferential location where no outer liner protrusion 538, no outer liner dimple 539*a*, no inner liner protrusion 544, and no inner liner dimple 545*a* are present. Therefore, the outer liner third height $h_{3a}$ defines a radial height of the combustion liner 504 in the post dilution zone where no dimples are present. An inner liner third height $h_{3b}$ is defined as the radial distance between the first outer liner profile 546 and the first inner liner profile 548 at the same axial location as the second inner liner dimple height $h_{3''}$ and at a circumferential location where no outer liner protrusion 538, no outer liner dimple 539*a*, no inner liner protrusion 544, and no inner liner dimple 545*a* are present. Therefore, the inner liner third height $h_{3b}$ defines a radial height of the combustion liner 504 in the post dilution zone where no dimples are present.

Figure 20:
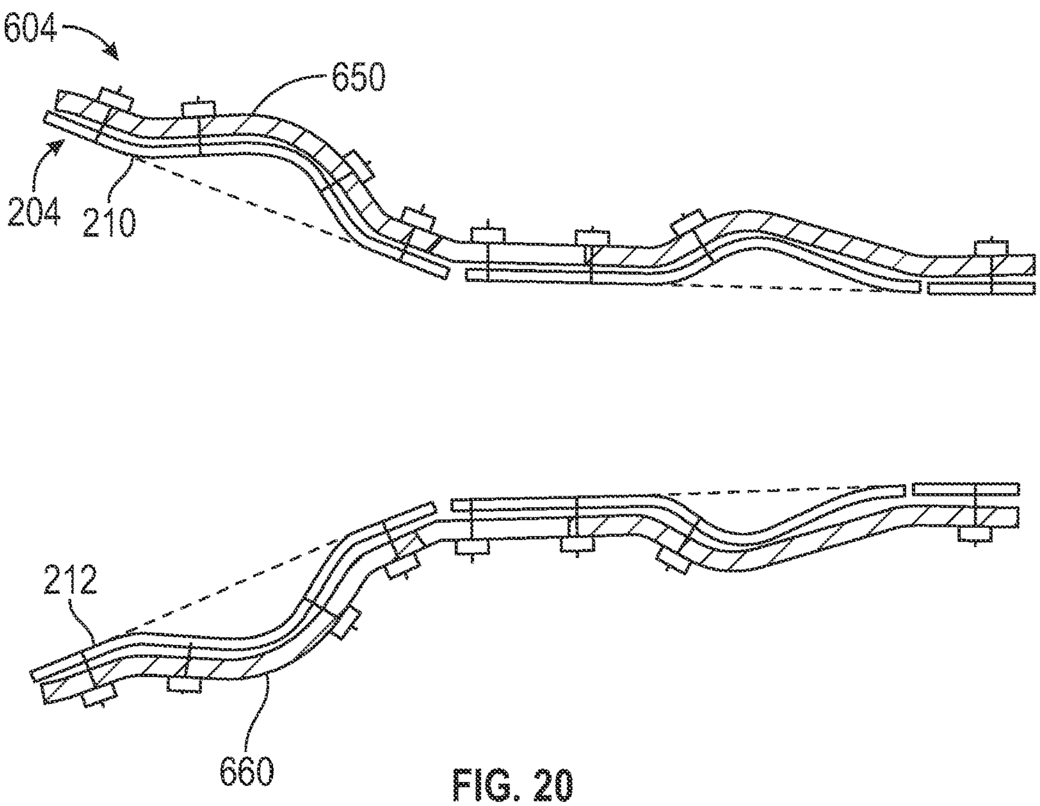
FIG. 20 illustrates a schematic, cross-sectional view, taken along line a similar line to line 5-5 of FIG. 4, of a combustion liner for a combustor for the engine of FIG. 1, according to an embodiment of the present disclosure.

FIG. 20 illustrates an alternative combustion liner 604. The combustion liner 604 includes the combustion liner 204 formed of the outer liner 210 and the inner liner 212. Additionally, the combustion liner 604 includes a plurality of outer liner planks 650 and a plurality of inner liner planks 660. The outer liner planks 650 may be dimpled and follow the contour of the outer liner 210. The inner liner planks 660 may be dimpled and follow the contour of the inner liner 212.

Figure 21:
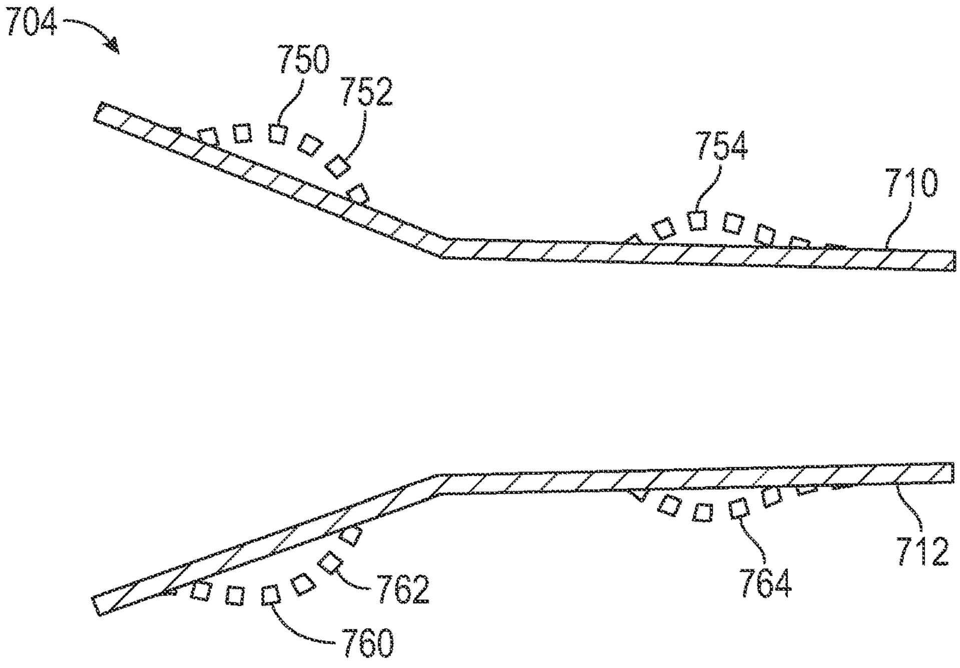
FIG. 21 illustrates a schematic, cross-sectional view, taken along line a similar line to line 5-5 of FIG. 4, of a combustion liner for a combustor for the engine of FIG. 1, according to an embodiment of the present disclosure.

Alternatively, as shown in FIG. 21, a combustion liner 704 may include an outer liner 710 and an inner liner 712 that include no protrusions and no dimples. Instead, the outer liner planks 750 may include a first plurality of outer liner protrusions 752 and a second plurality of outer liner protrusions 754. Likewise, the inner liner planks 760 may include a first plurality of inner liner protrusions 762 and a second plurality of inner liner protrusions 764.

Figure 22A:
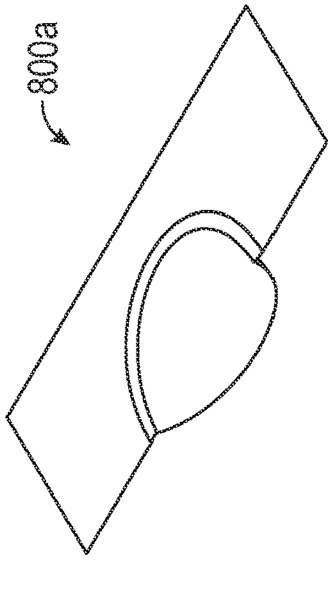
FIGS. 22A to 22I illustrate schematic views of shapes for the dimples in a combustion liner, according to an embodiment of the present disclosure.
Figure 22B:
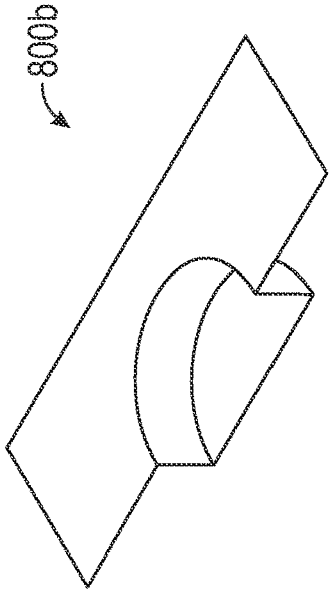
Figure 22C:
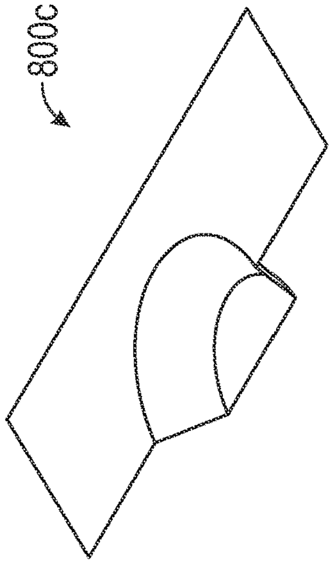
Figure 22D:
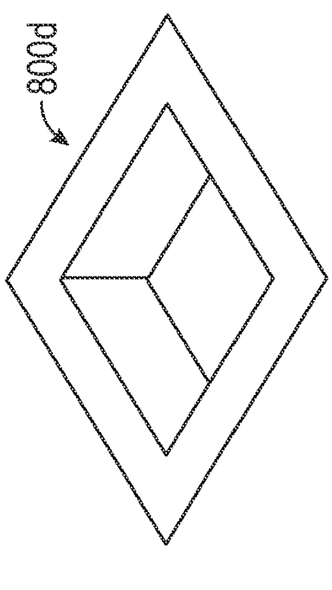
Figure 22E:
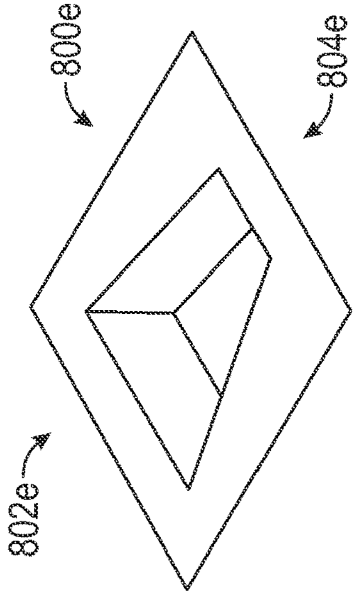
Figure 22F:
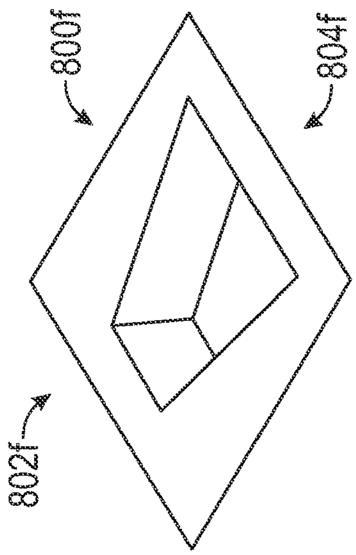
Figure 22G:
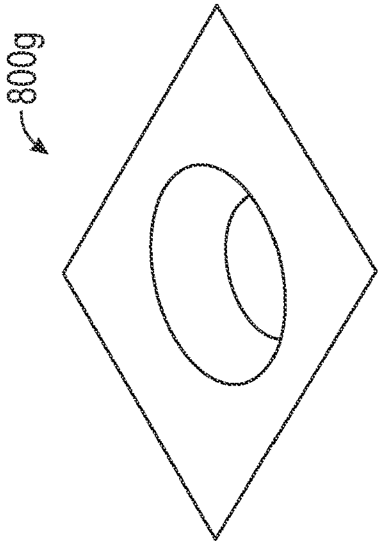
Figure 22H:
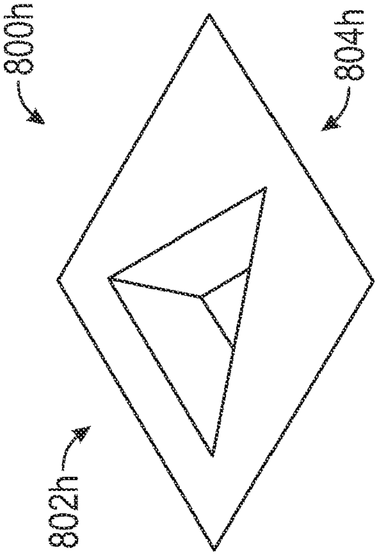
Figure 22I:
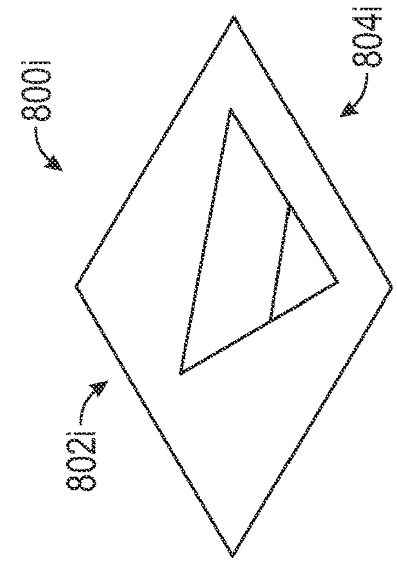

FIGS. 22A to 22I are exemplary shapes, but not limiting shapes, of the free form shapes that may form the dimples of the aforementioned combustion liners of FIGS. 3-20. The dimples may take any free form shape. FIG. 22A illustrates a spherical dimple 800*a*. FIG. 22B illustrates a circular dimple 800*b*. FIG. 22C illustrates a conical dimple 800*c*. FIG. 22D illustrates a rectangular dimple 800*d*. FIG. 22E illustrates a trapezoidal dimple 800*e* that narrows or converges from a forward end 802*e* to an aft end 804*e* of the dimple. FIG. 22F illustrates a trapezoidal dimple 800*f* that expands or diverges from a forward end 802*f* to an aft end 804*f* of the dimple. FIG. 22G illustrates an elliptical dimple 800*g*. FIG. 22H illustrates a triangular dimple 800*h* that narrows or converges from a forward end 802*h* to an aft end 804*h* of the dimple. FIG. 22I illustrates a triangular dimple 800*i* that expands or diverges from a forward end 802*j* to an aft end 804*j* of the dimple. The dimples of FIGS. 22A to 22I may be employed as any of the dimples and protrusions in the combustion liners described herein. The dimples of FIGS. 22A to 22I may be oriented in any number of locations on the outer liner and/or the inner liner. Regardless of the dimple shape chosen, the dimple will have blended edges, even if not depicted as such herein. A blended or smooth edge is an edge that is not a ninety-degree edge.

In some examples, only a single row of dimples may be present. That is, for example, a circumferential row of dimples may be present in only one of the forward section or in the aft section. In some examples, more than two rows of dimples may be present in the combustion liner. That is, a plurality of circumferential rows of dimples may be present in the combustion liner. In some examples, only the outer liner includes dimples. In some examples, only the inner liner includes dimples. In some examples, the dimples may be one or more dimples, may be included in one or both of the inner liner and the outer liner, may be included in one or both of the forward section and the aft section, may be any shape, size, or orientation, or any combination thereof. The number, shape, size, orientation, location, etc., of the dimples is improved based on the performance factor described herein. The dimples may be considered large cavity shaped dimples.

The aforementioned dimples move the inner surface of the combustion liner away from the hot gas and high-temperature combustion products generated in the combustion chamber to reduce the flame scrubbing on the radially inner surface of the combustion liner and to reduce distress to the combustion liner. The dimple location and geometry, thus, assists in altering, including, reducing the thermal gradient of the combustion products on the liner and the exit temperature profile and pattern. Optimizing the exit temperature profile and the pattern can affect part life downstream of the combustor, including, for example, improving the life of the high-pressure turbine nozzles and blades. The dimples may also reduce the combustor axial length (as compared to a combustion liner with no dimple) by increasing the volume of the combustion chamber in a radial direction due to the dimples.

Dimples provided in the forward section or the primary combustion zone may improve operability and altitude relight performance as compared to combustion liners with no dimples in the forward section. That is, inclusion of dimples in the primary combustion zone provides a local increase in the height of the combustor (e.g., through the inclusion of one or more dimples). The volume of the combustor increases at the location of each dimple. Increasing the volume of the combustor in the primary combustion zone improves the operability of the engine and allows the engine to be relit at high altitude, as compared to embodiments with no dimples in the forward section.

Furthermore, dimples provided in the aft section or the post dilution zone promotes CO burnout by improving local residence time (e.g., completing combustion of CO into $CO_2$). That is, inclusion of dimples in the post dilution zone assists in the completion of the combustion. Increasing the volume in the post dilution zone (e.g., through the inclusion of one or more dimples) increases the residence time of the combustion products leading to more complete combustion and lower CO and soot emissions, as compared to embodiments with no dimples in the aft section.

The combustion liners disclosed herein are designed to include a desired number, location, orientation, size, and shape of dimples to balance the benefits in the primary combustion zone and the post dilution zone to improve and prolong the life of the combustion liner, while also improving operability of the combustor. For example, a distribution of dimples in the primary or post dilution zone, whether in the number or heights of dimples, may show a dramatic reduction in flame scrubbing, the temperature and uniformity of the flame or heat produced may produce an unacceptable drop in combustor efficiency, because the increased volume associated with the dimples decreases the velocity of flow through the combustor, which increases residence time within the combustor, thus leading to increased $NO_x$ emissions. During the course of this evaluation the inventors, discovered, unexpectedly, that a relationship exists among the radial height of the combustion liner at the dimples in the primary combustion zone, the radial height of the combustion liner in the primary combustion zone without the dimples, the angle of the dimples, and the angle between adjacent fuel nozzles. The inventors also discovered, unexpectedly, that a relationship exists between the ratio of the radial height of the combustion liner at the dimples in the post dilution zone to the radial height of the combustion liner in the post dilution zone without the dimples (the dimple height factor), the ratio of the angle of the dimples to the angle between adjacent fuel nozzles (the dimple angular position ratio) and the working fluid pressure drop. These relationships (1) and (2), below, uniquely identify a finite and readily ascertainable (in view of this disclosure) number of embodiments suitable for a particular architecture that can reduce flame scrubbing, reduce liner distress, improve operability of the engine, improve relight performance, and promote carbon monoxide burn-out (e.g., improve local residence time). For example, relationships (1) and (2) balance a reduction in flame scrubbing and the unacceptable drop in operability due to the reduction in velocity and increased emissions.

Primary Combustion Zone Performance Factor $$(PF_{PCZ}) = \frac{h_{2'}}{h_2} \times \frac{\phi_B}{\theta_B} \times \left[\frac{DP}{P}\right] \times 100 \tag{1}$$

Post Dilution Zone Performance Factor $$(PF_{PDZ}) = \frac{h_{3'}}{h_3} \times \frac{\phi_D}{\theta_D} \times \left[\frac{DP}{P}\right] \times 100 \tag{2}$$

In relationship (1), the radial height $h_{2'}$ and the radial height $h_2$ are as defined previously, for example, with respect to FIGS. 5 and 6. The $\varnothing_B$ and $\theta_B$ are the dimple angle and the fuel nozzle assembly angle, respectively, are as defined previously, for example, with respect to FIG. 4, as taken at the plane 268 of FIG. 5. That is, the $\varnothing_B$ and $\theta_B$ are the angles at the first plurality of outer liner dimples 237 or the first plurality of inner liner dimples 243. In relationship (2), the radial height $h_{3'}$ and the radial height $h_3$ are as defined previously, for example, with respect to FIGS. 5 and 6. The $\varnothing_D$ and $\theta_D$ are the dimple angle and the fuel nozzle assembly angle, respectively, are as defined previously, for example, with respect to FIG. 4, as taken at the plane 270 of FIG. 5. That is, the $\varnothing_D$ and $\theta_D$ are the angles at the second plurality of outer liner dimples 239 or the second plurality of inner liner dimples 245.

The performance factor of relationship (1) is defined by the design of the combustion liner in the forward section or in the primary combustion zone, upstream of the plurality of dilution holes. The performance factor of relationship (2) is defined by the design of the combustion liner in the aft section or post dilution zone, downstream of the plurality of dilution holes.

The performance factor of the present disclosure is defined based on ratios of combustor liner heights (maximum combustor height in the dimple regions), ratio of angular extent of the dimple and angle between fuel nozzle center lines, and combustor working pressure drop. As combustor height in the forward section or the primary combustion zone increases, the operability of the engine increases as does the durability of the combustion liner in the forward section. That is, as the combustor height in the forward section (and, thus, the volume of the primary combustion zone) increases, the operability of the engine increases, which is represented by an increase in the performance factor.

As discussed further below, the inventors identified ranges where the Performance Factor is valid, for both the primary combustion zone and the post dilution zone, that enables a combustion liner (e.g., combustion liner 204, combustion liner 304, combustion liner 404, combustion liner 504, combustion liner 604, and combustion liner 704) to be designed to reduce flame scrubbing of the combustion liner. This relationship is applicable over different thrust classes, engine designs, and combustor designs, including narrow body designs, turbofan engines, RQL combustors (rich burn, quick quench, lean burn combustors), and lean burn combustors, reverse flow combustors, annular and can annular or can type combustors. Using this unique relationship, a combustor 100 design can be developed early in the design process that reduces flame scrubbing, reduces liner distress, improves operability of the engine, improves relight performance, and promotes carbon monoxide burn-out (e.g., improve local residence time).

In other embodiments, relationships (1) and (2) may be used to help make preliminary determinations on combustor liner design early in the process of designing an engine. When developing a gas turbine engine, the interplay between components can make it particularly difficult to select or to develop one component during engine design and prototype testing, especially, when some components are at different stages of completion. For example, one or more components may be nearly complete, yet one or more other components may be in an initial or preliminary phase such that only one (or a few) design parameters are known. The inventors desire to arrive at what is possible at an early stage of design, so that the down selection of candidate designs, given the tradeoffs, become more possible. The process has sometimes been more ad hoc, selecting one design or another without knowing the impact when a concept is first taken into consideration. For example, various aspects of the fan section 16 design, the high-pressure compressor 24 design, and/or the low-pressure compressor 22 design may not be known, but such components impact the core airflow 60 through the combustor 26, and, thus, may influence the design of the combustion liner 104.

Tables 1 to 3 describe exemplary embodiments 1 to 9 identifying the performance factor (PF) for various gas turbine engines. The embodiments 1 to 9 may be employed in an RQL combustor. That is, a rich burn, quick quench, lean burn combustor. The embodiments 1 to 9 can be applied to any of the combustion liners described in FIGS. 3 to 21. Although described with respect to an RQL combustor, dimples may be included in lean burn combustors as well. In the example of a lean combustor, only the dimples in the forward section (e.g., in the primary combustion zone) may be present.

The variable n represents the number of fuel nozzle assemblies. The height $h_1$, the height $h_2$, the height $h_3$, and the height $h_4$ are as identified with respect to FIG. 6.

TABLE 1

| Embodiments | n | $h_1$ | $h_2$ | $h_3$ | $h_4$ |
|---|---|---|---|---|---|
| 1 | 30 | 4.62 | 4.66 | 4.47 | 2.69 |
| 2 | 18 | 3 | 3.404 | 2.95 | 2.52 |
| 3 | 16 | 2.9 | 3.404 | 2.95 | 2.52 |
| 4 | 20 | 3.39 | 3.404 | 2.95 | 2.52 |
| 5 | 28 | 3.9 | 3.404 | 2.95 | 2.52 |

TABLE 1-continued

| Embodiments | n | $h_1$ | $h_2$ | $h_3$ | $h_4$ |
|---|---|---|---|---|---|
| 6 | 30 | 4 | 3.404 | 2.95 | 2.52 |
| 7 | 18 | 3.5 | 3.5 | 2.84 | 2.51 |
| 8 | 28 | 3.9 | 3.404 | 2.95 | 2.52 |
| 9 | 18 | 3.5 | 3.5 | 2.84 | 2.51 |

In Table 2, $$\frac{DP}{P}$$

represents the working fluid pressure drop, where DP is the fluid pressure at the compressor exit minus the fluid pressure at the combustor exit and P is the fluid pressure at the compressor exit. The working fluid pressure drop controls the flow and the velocity in the primary combustion zone, which, in turn controls mixing in the primary combustion zone. The working fluid pressure drop is between four percent and seven percent, inclusive of the end points. In some examples, the working fluid pressure drop is between 4.5 percent and 5.4 percent, inclusive of the end points. The working fluid pressure is dependent on the engine design and engine operating cycle.

The relationship $$\frac{h_2}{h_{2'}}$$

shown in Table 2 represents me dimple height factor of the forward section or the primary combustion zone. The dimple height factor of the primary combustion zone is greater than or equal to 0.67 and less than or equal to 0.99. In some examples, the dimple height factor of the primary combustion zone is greater than or equal to 0.7 and less than or equal to 0.9. Likewise, the relationship $$\frac{h_3}{h_{3'}}$$

shown in Table 2 represents the dimple height factor of the aft section or the post dilution zone. The dimple height factor of the post dilution zone is greater than or equal to 0.67 and less than or equal to 0.99. In some examples, the dimple height factor of the post dilution zone is greater than or equal to 0.7 and less than or equal to 0.9. The dimple height factor $$\frac{h_2}{h_{2'}}$$

defines the size and the shape of the dimples in the forward section (e.g., in the primary combustion zone). The dimple height factor $$\frac{h_3}{h_{3'}}$$

defines the size and shape of the dimples of the aft section (e.g., in the post dilution zone).

When selecting the dimple height factor, there is a balancing between operability of the combustor and $NO_x$ emissions. As the dimple height factor decreases, combustor operability increases. Additionally, the velocity of the flow in the combustor decreases, which results in an increase in residence time, and ultimately, an increase in $NO_x$ emissions. As the dimple height factor increases, $NO_x$ emissions decreases, however, operability decreases as well (both due to the reduced volume in the combustor). Accordingly, the dimple height factor is selected within the range of 0.67 to 0.99, inclusive of the end points, to balance operability of the combustor and $NO_x$ emissions. A dimple height factor equal to or below 0.67 will result in $NO_x$ emissions greater than a desired amount and a dimple height factor equal to or above 0.99 will result in operability below a desired level.

Table 2 also shows $$\frac{\phi}{\theta},$$

which represents the dimple angular position ratio. The dimple angular position ratio, as mentioned above, may be taken at the first plurality of outer liner dimples 237, the second plurality of outer liner dimples 238, the first plurality of inner liner dimples 243, or the second plurality of inner liner dimples 245. The dimple angular position ratio is greater than or equal to 0.1 and less than or equal to one. In some examples, the dimple angular position ratio is greater than or equal to 0.1 and less than or equal to 0.5. The dimple angular position ratio defines both the quantity of dimples and the angular position of the dimples.

The dimple angle Ø can be the dimple angle $Ø_O$ of the dimple 237 of the outer liner or the dimple angle $Ø_I$ of the dimple 243 of the inner liner, as identified, for example, with respect to FIG. 4. In some cases, the dimple angle $Ø_O$ and the dimple angle $Ø_I$ may be the same. The dimple angle Ø may be taken at the first plurality of outer liner dimples 237, the second plurality of outer liner dimples 239, the first plurality of inner liner dimples 243, or the second plurality of inner liner dimples 245. The angle θ is the angle identified, for example, with respect to FIG. 4. The angle θ is defined by relationship (3) where n is the number of fuel nozzle assemblies. In some examples, n is between fifteen and thirty, inclusive of the end points.

$$\theta = \frac{360}{n} \tag{3}$$

TABLE 2

| Embodiments | DP/P | $h_{2'}/h_2$ | $h_{3'}/h_3$ | Ø/θ | $h_4/h_2$ | $h_4/h_3$ | $h_2/h_{2'}$ | $h_3/h_{3'}$ |
|---|---|---|---|---|---|---|---|---|
| 1 | 5.69 | 1.1 | 1.1 | 0.3 | .58 | .6 | .91 | .91 |
| 2 | 4.9 | 1.05 | 1.2 | 0.2 | .74 | .85 | .95 | .83 |
| 3 | 5.1 | 1.2 | 1.3 | 0.3 | .74 | .85 | .83 | .77 |
| 4 | 4.9 | 1.3 | 1.2 | 0.5 | .74 | .85 | .77 | .83 |
| 5 | 5.2 | 1.15 | 1.15 | 0.8 | .74 | .85 | .87 | .87 |
| 6 | 5.1 | 1.01 | 1.01 | 0.9 | .74 | .85 | .99 | .99 |
| 7 | 5 | 1.18 | 1.15 | 0.99 | .88 | .85 | .85 | .87 |

TABLE 2-continued

| Embodiments | DP/P | $h_{2'}/h_2$ | $h_{3'}/h_3$ | Ø/θ | $h_4/h_2$ | $h_4/h_3$ | $h_2/h_{2'}$ | $h_3/h_{3'}$ |
|---|---|---|---|---|---|---|---|---|
| 8 | 5.2 | 1.5 | 1.5 | .8 | .74 | .85 | .67 | .67 |
| 9 | 5.0 | 1.4 | 1.4 | .99 | .72 | .88 | .71 | .71 |

The dimples may also be defined by the relationships $$\frac{h_4}{h_{2'}}$$

and $$\frac{h_4}{h_{3'}}.$$

The relationship $$\frac{h_4}{h_{2'}},$$

which, defines the dimple in the forward section (e.g., in the primary combustion zone). The relationship $$\frac{h_4}{h_{2'}}$$

may be between 0.2 and 0.99, inclusive of the end points. The relationship $$\frac{h_4}{h_{3'}},$$

which, defines the dimple in the aft section (e.g., in the post dilution zone) may be between 0.5 and 0.99, inclusive of the end points.

Table 3 illustrates the performance factor. The performance factor (PF) is determined based on each of relationships (1) and (2) described above. The performance factor of the forward section or the primary combustion zone, $PF_{PCZ}$ in Table 3, is greater than one or equal to and less than or equal to seven. In some examples, the performance factor of the forward section or the primary combustion zone is greater than or equal to one and less than or equal to three and one half. The performance factor of the aft section or the post dilution zone, $PF_{DZ}$ in Table 3, is greater than or equal to one and less than or equal to seven. In some examples, the performance factor of the aft section or the dilution zone is greater than one or equal to and less than or equal to three and one half.

TABLE 3

| Embodiments | $PF_{PCZ}$ | $PF_{DZ}$ |
|---|---|---|
| 1 | 1.88 | 1.88 |
| 2 | 1.03 | 1.18 |
| 3 | 1.84 | 1.99 |

TABLE 3-continued

| Embodiments | $PF_{PCZ}$ | $PF_{DZ}$ |
|---|---|---|
| 4 | 3.19 | 2.94 |
| 5 | 4.78 | 4.78 |
| 6 | 4.64 | 4.64 |
| 7 | 5.84 | 5.69 |
| 8 | 6.24 | 6.24 |
| 9 | 6.93 | 6.93 |

When the performance factor is non-zero, the engine has improved starting abilities, improved CO burn, and a lower liner temperature as compared to an engine with a performance factor of zero. A performance factor above seven violates emission requirements. That is, a performance factor above seven results in $NO_x$ and CO emissions above government set emissions regulations. Furthermore, a performance factor above seven negatively impacts fuel consumption. As the working pressure drop increases, fuel consumption increases. Thus, the performance factor is greater than one or equal to and less than or equal to seven for the aforementioned reasons.

Although not shown in Table 3, when the dimples are offset or misaligned, such as in the axially offset example of FIG. 19, there may be more than one performance factor in the forward section and/or more than one performance factor in the aft section. That is, for example, and referring to FIG. 19, there may be a performance factor based on $h_{2'}$, a performance factor based on $h_{2''}$, a performance factor based on $h_{3'}$, and a performance factor based on $h_{3''}$, each determined by relationships (1) or (2) and substituting the necessary "double prime" variable.

Figure 23:
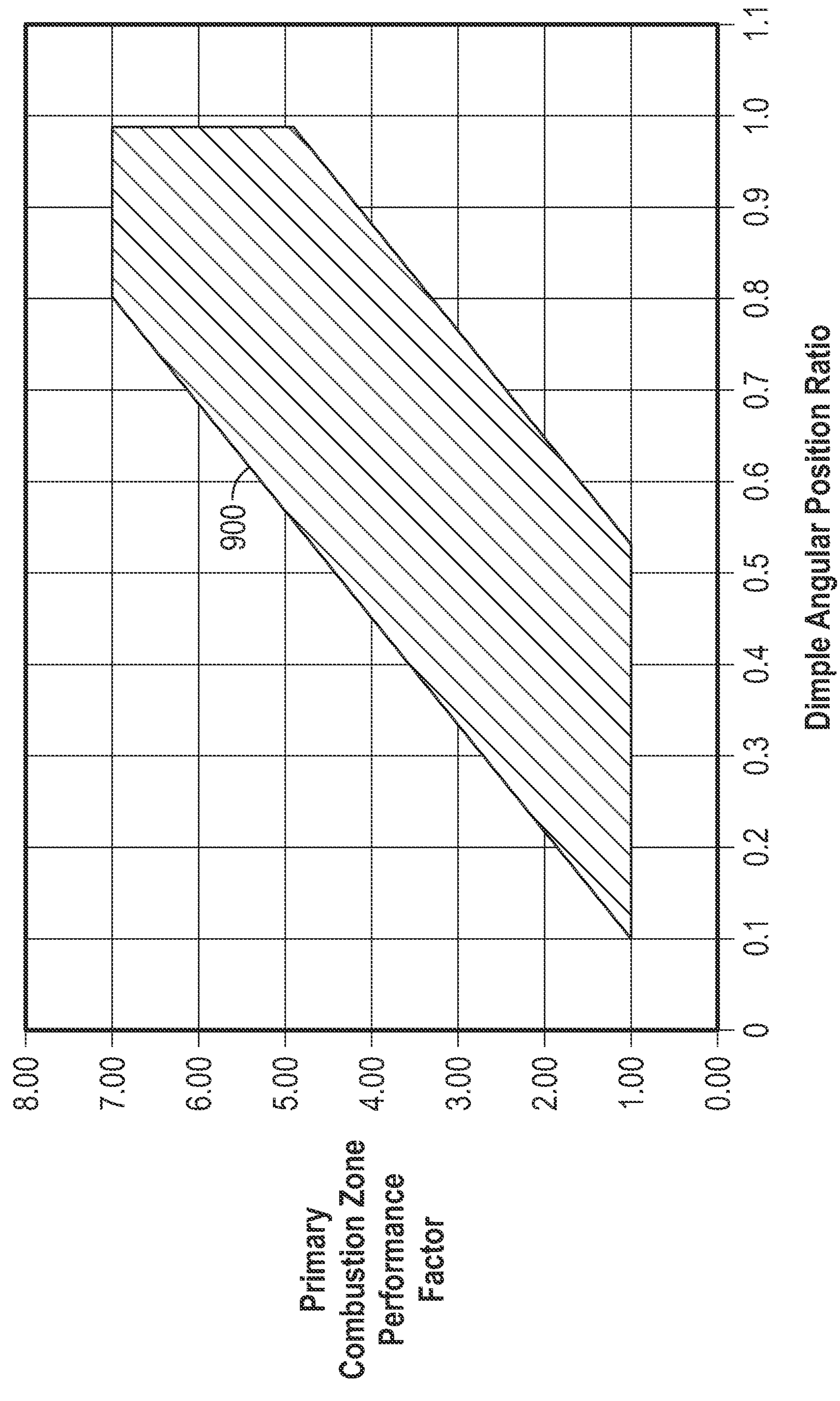
FIG. 23 is a graph illustrating a primary combustion zone performance factor as a function of dimple angular position ratio.
Figure 24:
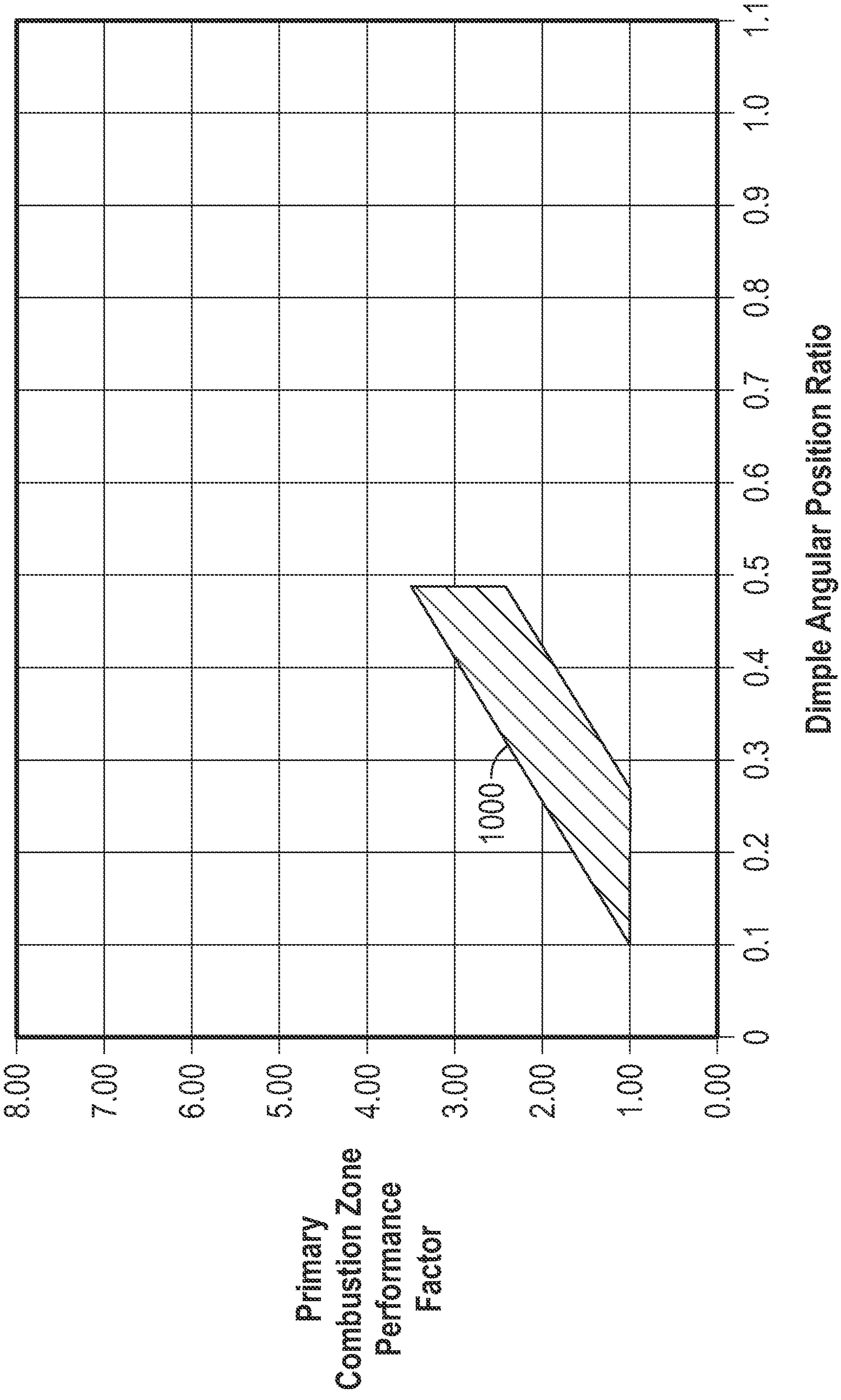
FIG. 24 is a graph illustrating a primary combustion zone performance factor as a function of dimple angular position ratio.

FIGS. 23 and 24 represent, in graph form, the performance factor of the forward section or the primary combustion zone as a factor of the dimple angular position ratio. FIGS. 23 and 24 show that the performance factor of the primary combustion zone may change based on the dimple angular position ratio. Areas 900 and 1000 may represent the boundaries of the performance factor of the primary combustion zone as a function of dimple angular position ratio in which a particular combustion liner is designed.

Figure 25:
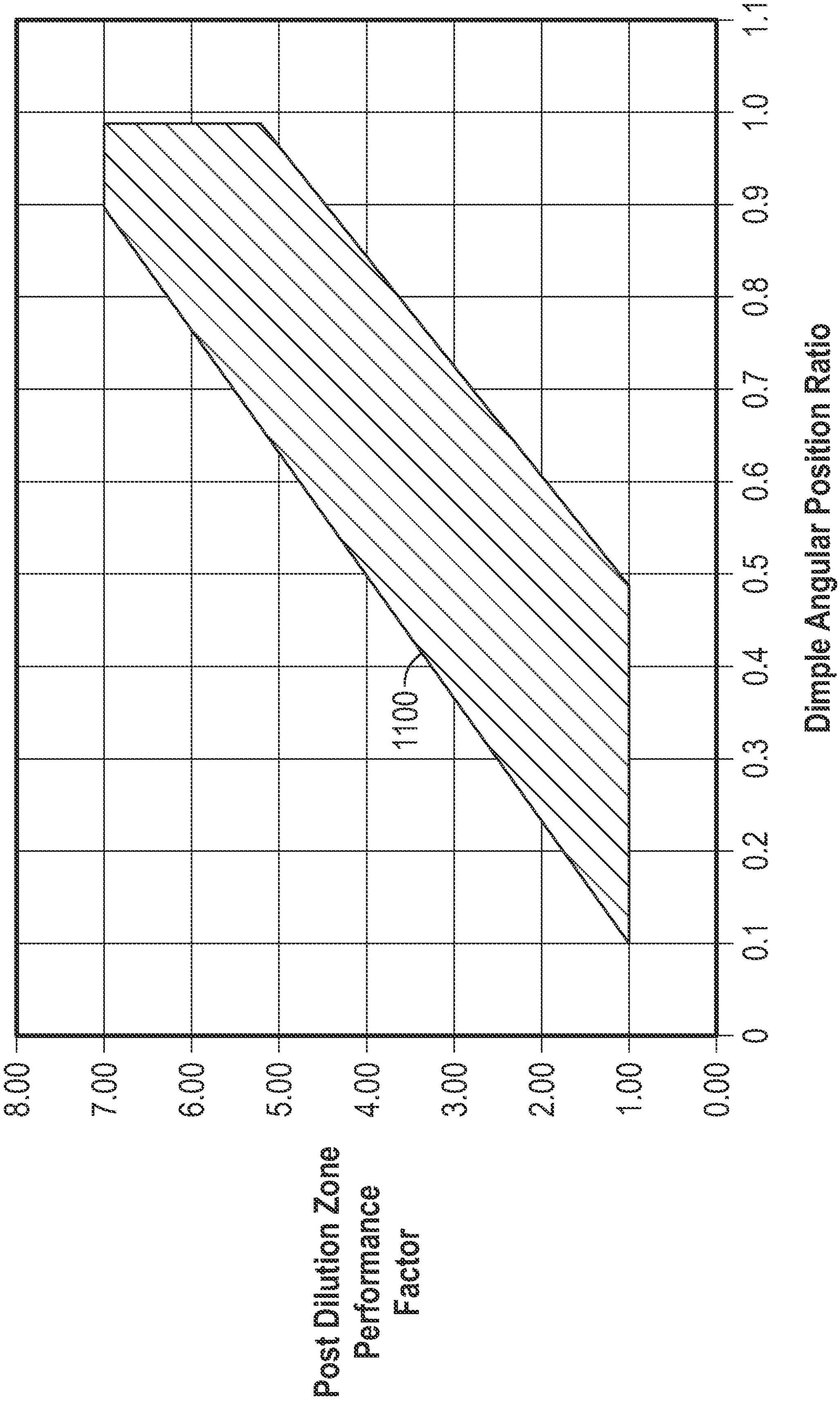
FIG. 25 is a graph illustrating a dilution zone performance factor as a function of dimple angular position ratio.
Figure 26:
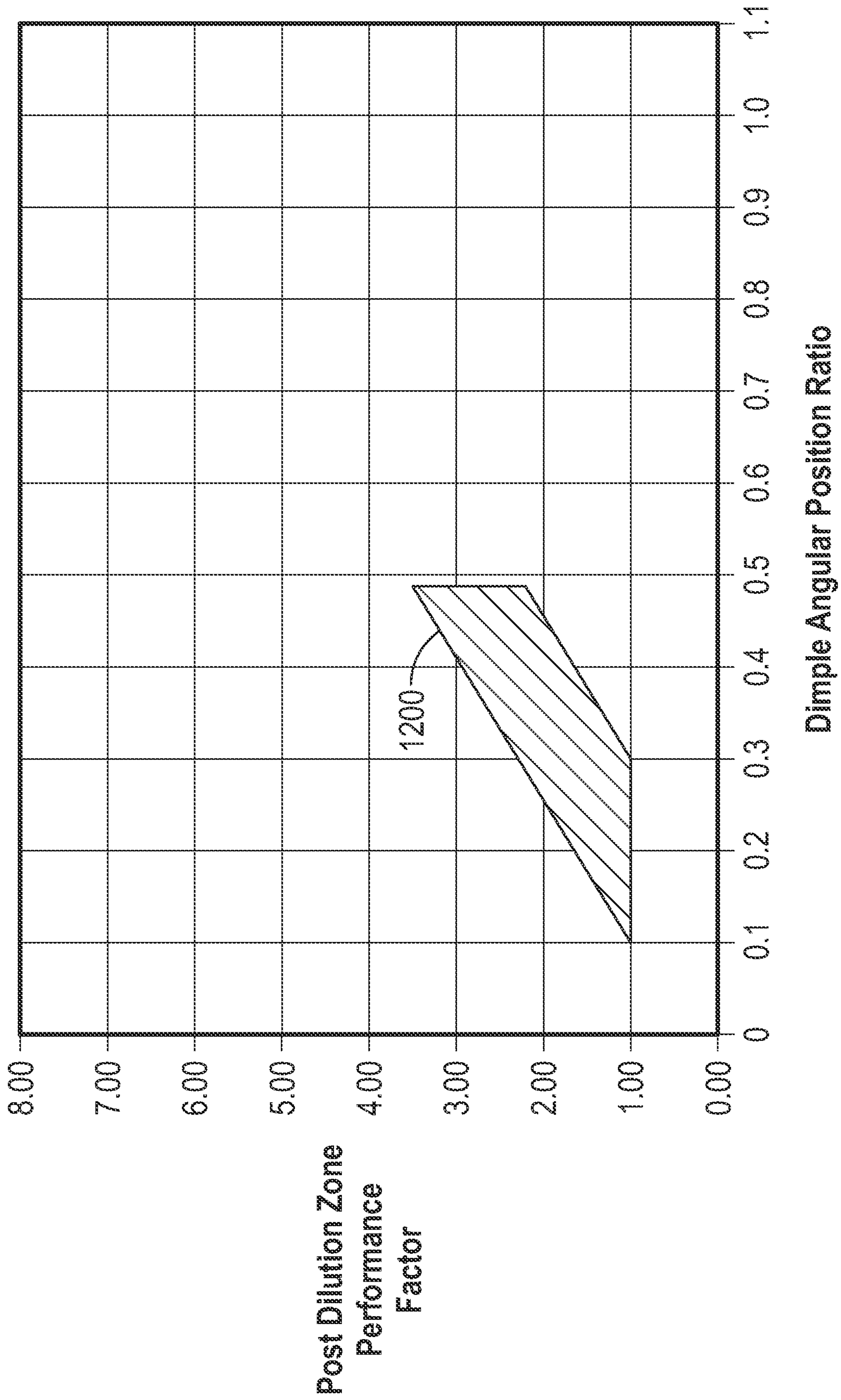
FIG. 26 is a graph illustrating a dilution zone performance factor as a function of dimple angular position ratio.

FIGS. 25 and 26 represent, in graph form, the performance factor of the aft section or the post dilution zone as a factor of the dimple angular position ratio. FIGS. 25 and 26 show that the performance factor of the dilution may change based on the dimple angular position ratio. Areas 1100 and 1200 may represent the boundaries of the performance factor of the dilution zone as a function of dimple angular position ratio in which a particular combustion liner is designed.

Figure 27:
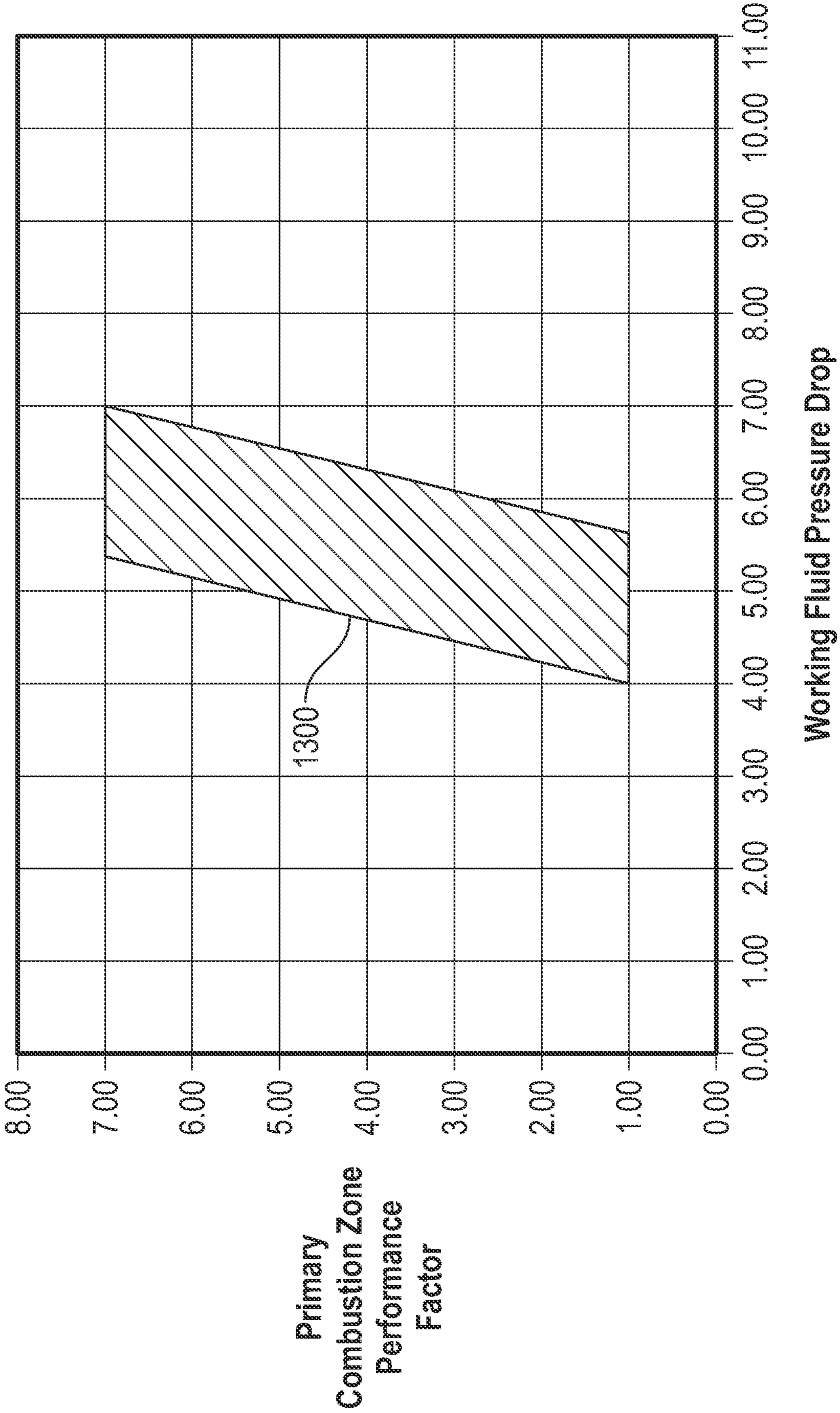
FIG. 27 is a graph illustrating a primary combustion zone performance factor as a function of working fluid pressure drop.
Figure 28:
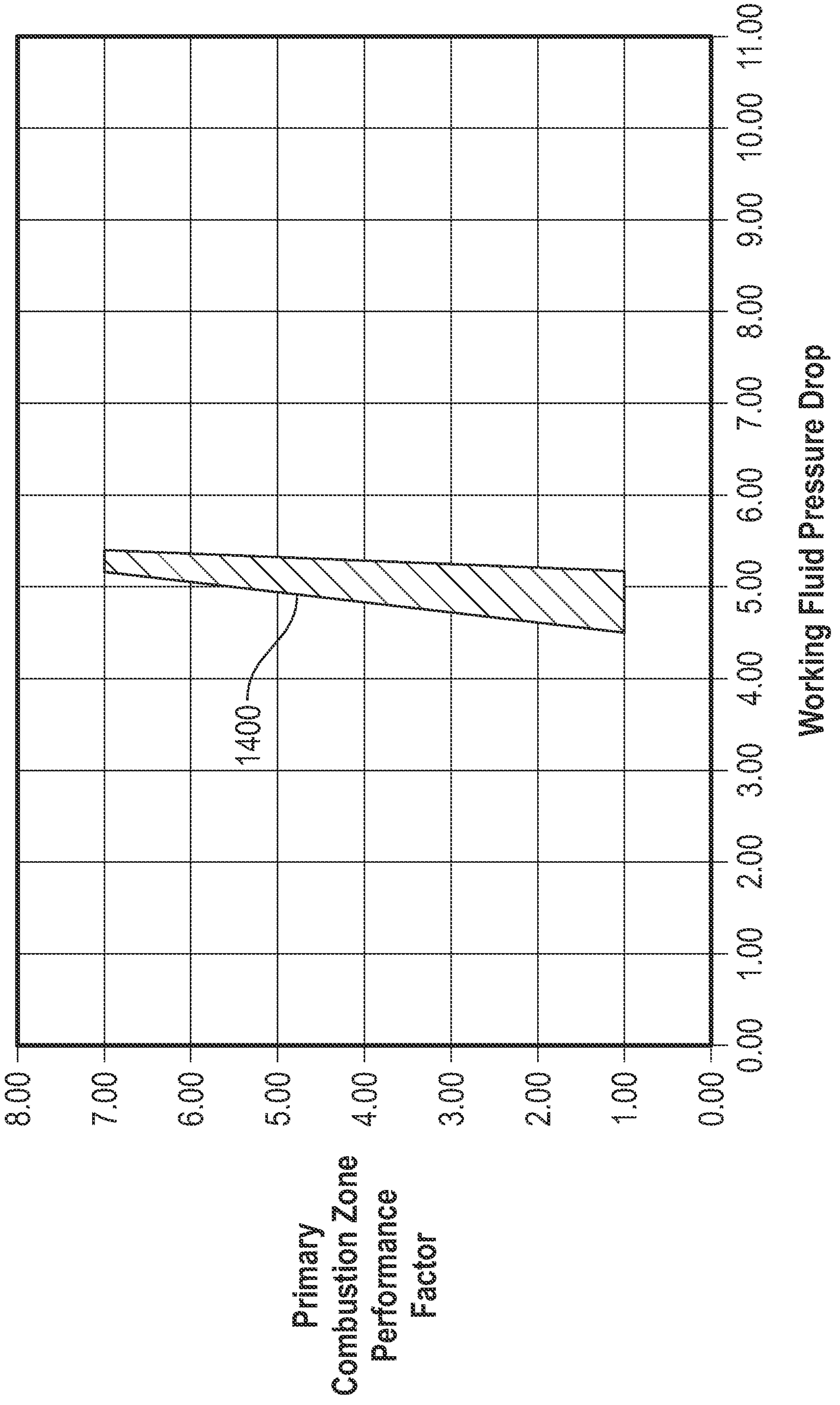
FIG. 28 is a graph illustrating a primary combustion zone performance factor as a function of working fluid pressure drop.

FIGS. 27 and 28 represent, in graph form, the performance factor of the forward section or the primary combustion zone as a factor of the working fluid pressure drop. FIGS. 27 and 28 show that the performance factor of the primary combustion zone may change based on the working fluid pressure drop. Areas 1300 and 1400 may represent the boundaries of the performance factor of the primary combustion zone as a function of working fluid pressure drop in which a particular combustion liner is designed.

Figure 29:
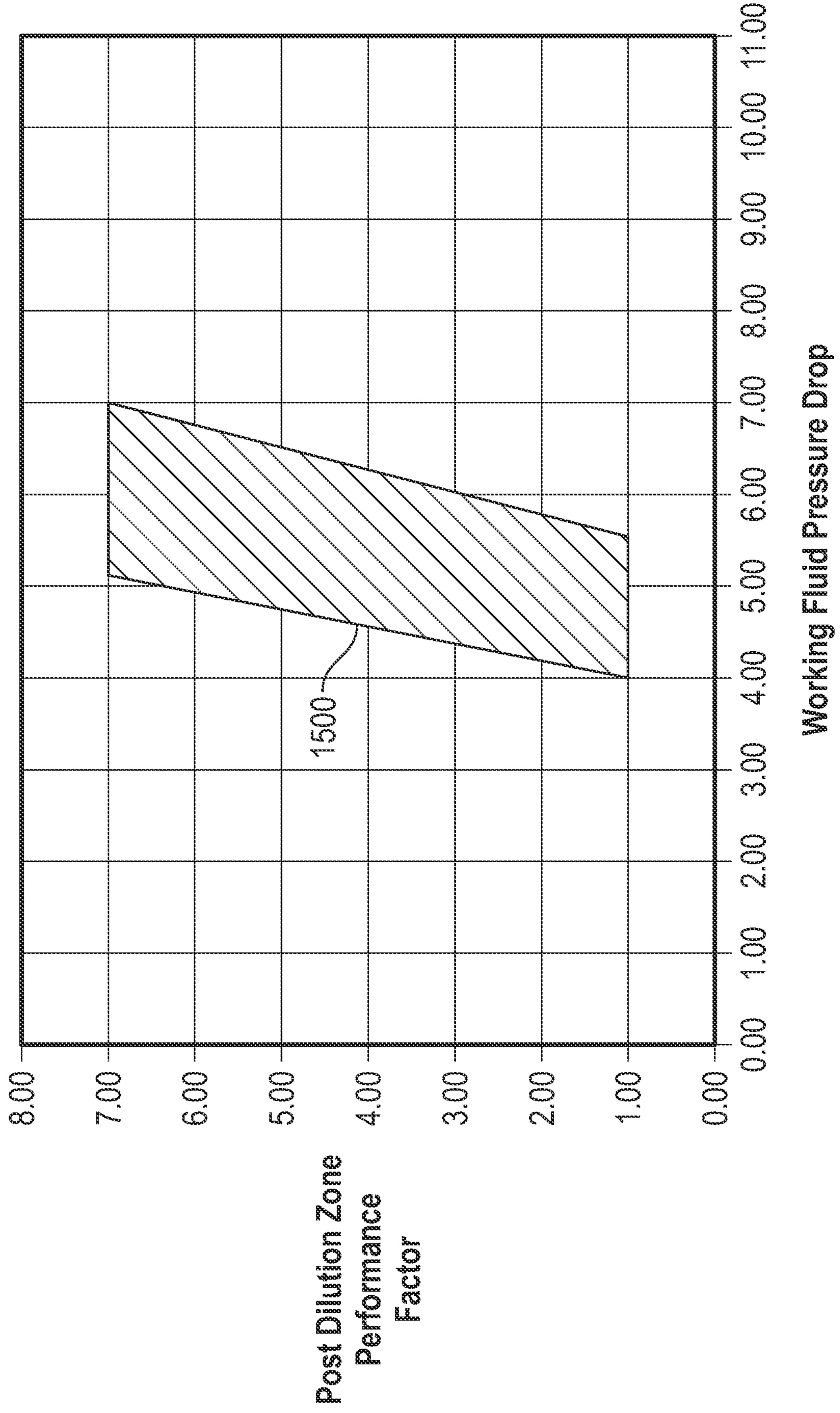
FIG. 29 is a graph illustrating a dilution zone performance factor as a function of working fluid pressure drop.
Figure 30:
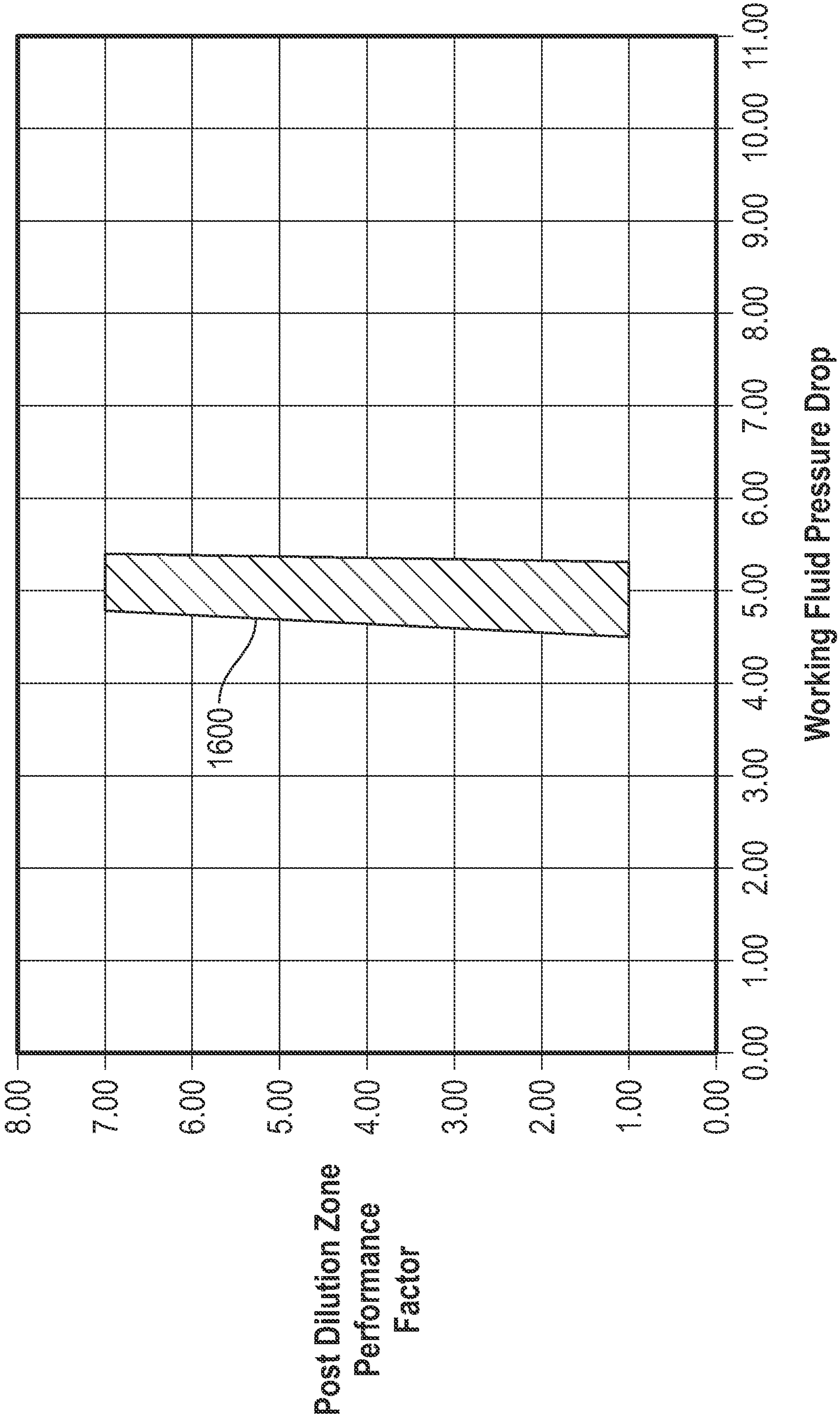
FIG. 30 is a graph illustrating a dilution zone performance factor as a function of working fluid pressure drop.

FIGS. 29 and 30 represent, in graph form, the performance factor of the aft section or the post dilution zone as a factor of the working fluid pressure drop. FIGS. 29 and 30 show that the performance factor of the post dilution zone may change based on the working fluid pressure drop. Areas 1500 and 1600 may represent the boundaries of the performance factor of the post dilution zone as a function of working fluid pressure drop in which a particular combustion liner is designed.

Figure 31:
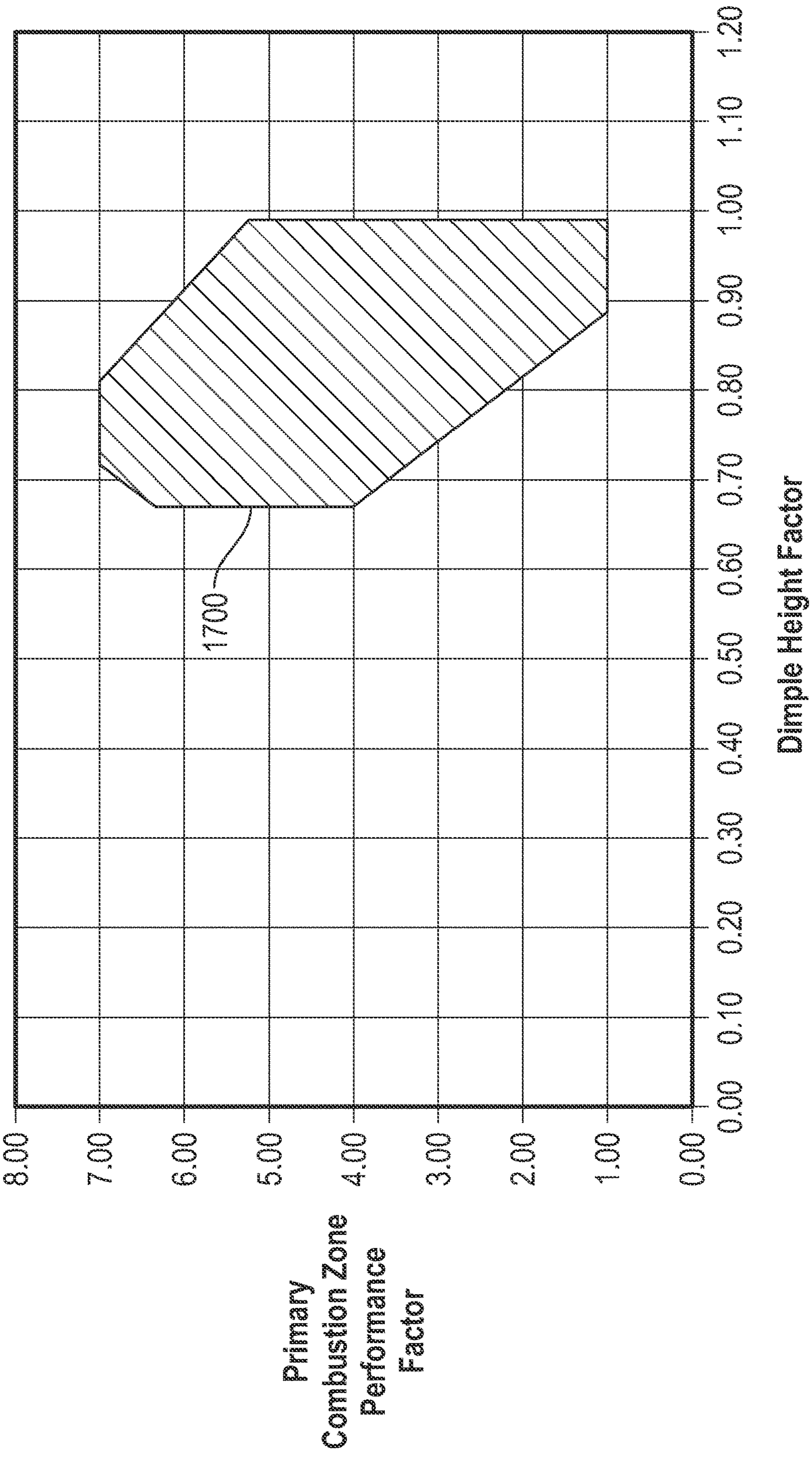
FIG. 31 is a graph illustrating a primary combustion zone performance factor as a function of dimple height factor.
Figure 32:
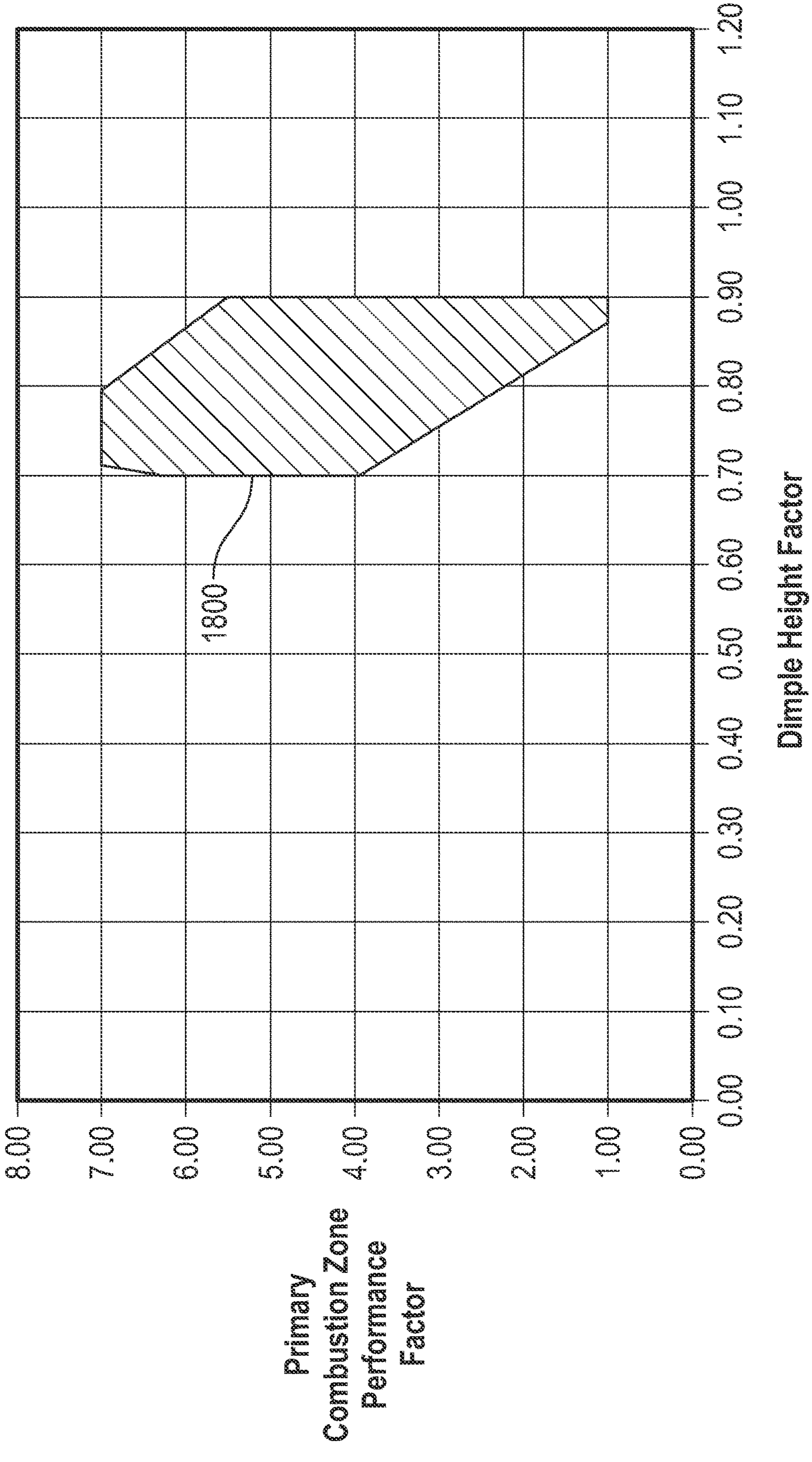
FIG. 32 is a graph illustrating a primary combustion zone performance factor as a function of dimple height factor.

FIGS. 31 and 32 represent, in graph form, the performance factor of the forward section or the primary combustion zone as a factor of the dimple height factor in the primary combustion zone (e.g., $$\frac{h_2}{h_{2'}}).$$

FIGS. 31 and 32 show that the performance factor of the primary combustion zone may change based on the dimple height factor in the primary combustion zone. Areas 1700 and 1800 may represent the boundaries of the performance factor of the primary combustion zone as a function of the dimple height factor in the primary combustion zone in which a particular combustion liner is designed.

Figure 33:
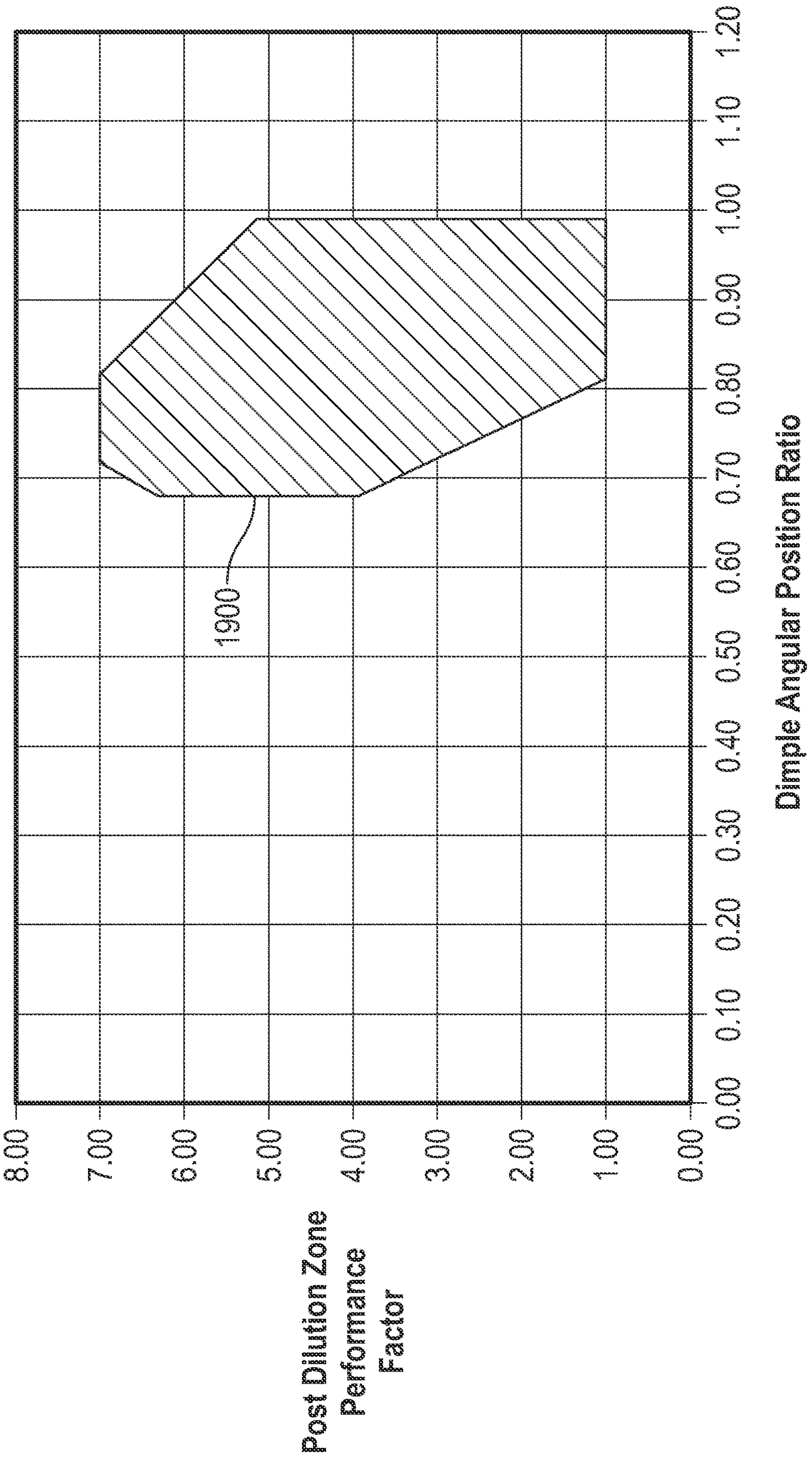
FIG. 33 is a graph illustrating a dilution zone performance factor as a function of dimple height factor.
Figure 34:
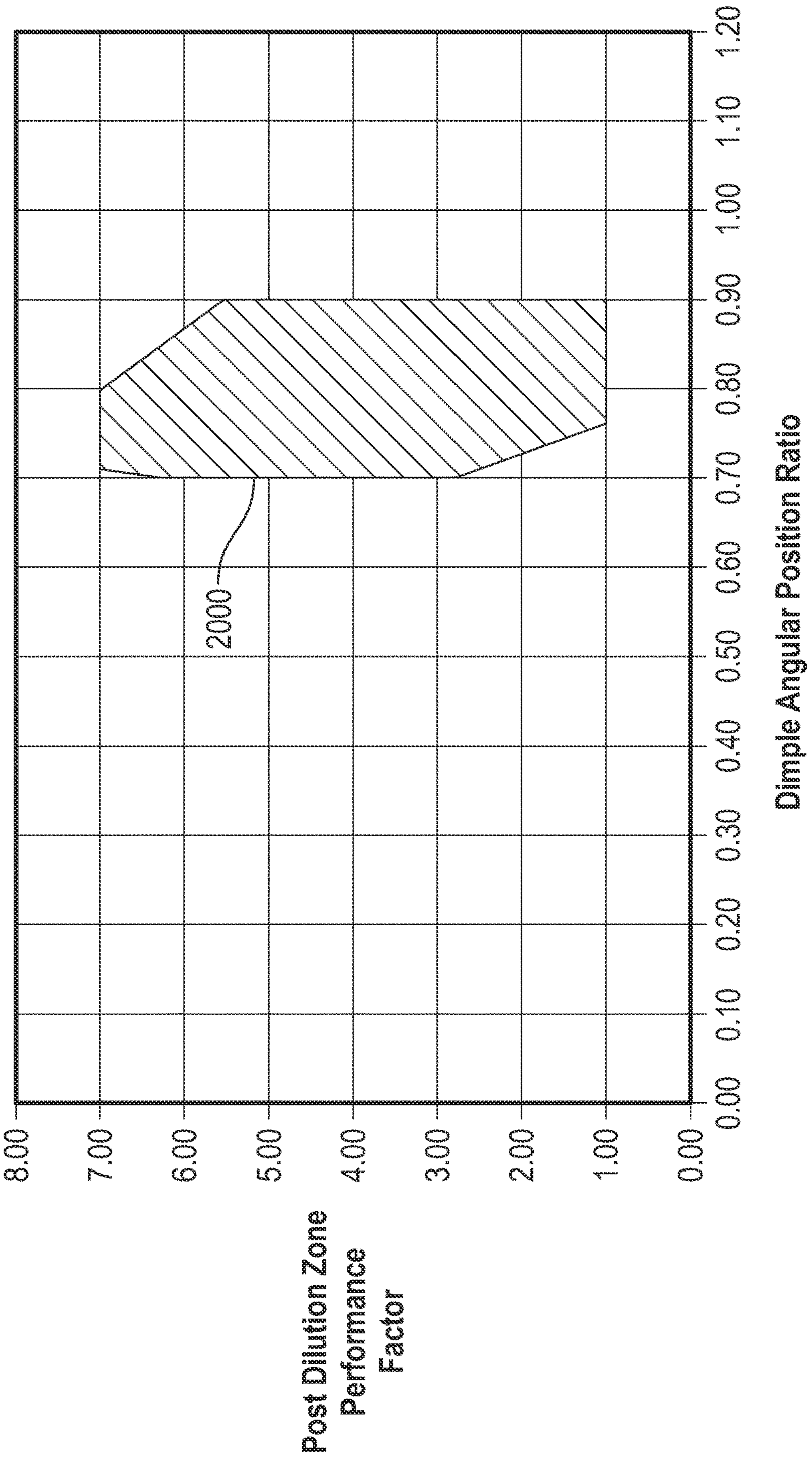
FIG. 34 is a graph illustrating a dilution zone performance factor as a function of dimple height factor.

FIGS. 33 and 34 represent, in graph form, the performance factor of the aft section or the post dilution zone as a factor of the dimple height factor in the post dilution zone (e.g., $$\frac{h_3}{h_{3'}}).$$

FIGS. 33 and 34 show that me performance factor of the post dilution zone may change based on the dimple height factor in the post dilution zone. Areas 1500 and 1600 may represent the boundaries of the performance factor of the post dilution zone as a function of the dimple height factor in the post dilution zone in which a particular combustion liner is designed.

Further aspects of the present disclosure are provided by the subject matter of the following clauses.

According to an aspect of the disclosure, an annular combustor comprises a combustion liner and a plurality of dimples in the combustion liner. The combustion liner defining a combustion chamber and the combustion liner has an outer liner and an inner liner. The combustion liner is characterized by a performance factor greater than or equal to one and less than or equal to seven.

The annular combustor of the preceding claim, wherein the performance factor is greater than or equal to one and less than or equal to three and one-half.

The annular combustor of any preceding clause, wherein the performance factor includes a primary combustion zone performance factor and a post dilution zone performance factor. Each of the primary combustion zone performance factor and the post dilution zone performance factor is greater than or equal to one and less than or equal to seven.

The annular combustor of any preceding clause, wherein the primary combustion zone performance factor is defined by a dimple height factor of a dimple in a primary combustion zone of the annular combustor, a dimple angular position ratio of a dimple in the primary combustion zone, and a working fluid pressure drop across the annular combustor.

The annular combustor of any preceding clause, wherein the post dilution zone performance factor is defined by a dimple height factor of a dimple in a post dilution zone of the annular combustor, a dimple angular position ratio of a dimple in the post dilution zone, and a working fluid pressure drop across the annular combustor.

The annular combustor of any preceding clause, wherein the performance factor is defined by a dimple height factor, a dimple angular position ratio, and a working fluid pressure drop across the annular combustor.

The annular combustor of any preceding clause, wherein the dimple height factor and the dimple angular position ratio are measured at a plane extending radially through at least one dimple of the plurality of dimples and extending perpendicular to a combustor centerline.

The annular combustor of any preceding clause, wherein the dimple height factor is greater than or equal to 0.1 and less than or equal to 0.9.

The annular combustor of any preceding clause, wherein the dimple height factor is greater than or equal to 0.1 and less than or equal to 0.3.

The annular combustor of any preceding clause, wherein the dimple height factor is defined by a ratio of a height of the combustion liner to a dimple height.

The annular combustor of any preceding clause, wherein the dimple height is taken at a maximum height of a dimple of the plurality of dimples.

The annular combustor of any preceding clause, wherein the dimple height and the height are taken at axially the same location and circumferentially offset locations.

The annular combustor of any preceding clause, wherein the dimple angular position ratio is greater than or equal to 0.1 and less than or equal to one.

The annular combustor of any preceding clause, wherein the dimple angular position ratio is greater than or equal to 0.1 and less than or equal to 0.5.

The annular combustor of any preceding clause, wherein the dimple angular position ratio defines a quantity of the plurality of dimples and an angular position of each dimple of the plurality of dimples.

The annular combustor of any preceding clause, wherein the dimple angular position ratio is defined by a dimple angle and a fuel nozzle assembly angle.

The annular combustor of any preceding clause, wherein the fuel nozzle assembly angle is defined by a number of fuel nozzle assemblies connected to the annular combustor and an angle between a centerline of two adjacent fuel nozzles.

The annular combustor of any preceding clause, wherein the working fluid pressure drop is defined by a fluid pressure at an exit of a compressor and a fluid pressure at an exit of the annular combustor.

The annular combustor of any preceding clause, wherein the working fluid pressure drop is between four percent and seven percent, inclusive of the end points.

The annular combustor of any preceding clause, wherein the working fluid pressure drop is between 4.5 and 5.4 percent, inclusive of the end points.

The annular combustor of any preceding clause, wherein the plurality of dimples extends radially away from the combustion chamber to enlarge a volume of the combustion chamber.

The annular combustor of any preceding clause, further comprising a plurality of dilution holes in the combustion liner.

The annular combustor of any preceding clause, wherein the plurality of dilution holes comprises a first plurality of dilution holes in the outer liner and a second plurality of dilution holes in the inner liner.

The annular combustor of any preceding clause, wherein the plurality of dimples includes a plurality of dimples upstream of the plurality of dilution holes.

The annular combustor of any preceding clause, wherein the combustion chamber defines a primary combustion zone and a post dilution zone. The plurality of dimples upstream of the plurality of dilution holes are located in the primary combustion zone.

The annular combustor of any preceding clause, wherein the plurality of dimples includes a plurality of dimples downstream of the plurality of dilution holes.

The annular combustor of any preceding clause, wherein the combustion chamber defines a primary combustion zone and a post dilution zone. The plurality of dimples downstream of the plurality of dilution holes are located in the post dilution zone.

The annular combustor of any preceding clause, wherein the plurality of dimples includes a first plurality of dimples upstream of the plurality of dilution holes and a second plurality of dimples downstream of the plurality of dilution holes.

The annular combustor of any preceding clause, wherein the first plurality of dimples includes a first plurality of outer liner dimples in the outer liner and a first plurality of inner liner dimples in the inner liner. The second plurality of dimples includes a second plurality of outer liner dimples in the outer liner and a second plurality of inner liner dimples in the inner liner.

The annular combustor of any preceding clause, wherein the first plurality of dimples are each circumferentially aligned with a respective dimple of the second plurality of dimples.

The annular combustor of any preceding clause, wherein the combustion liner is a converging combustion liner such that the outer liner and the inner liner converge radially toward each other from a forwardmost end of the combustion liner to an aftmost end of the combustion liner.

The annular combustor of any preceding clause, wherein the converging combustion liner converges continuously and gradually from the forwardmost end to the aftmost end.

The annular combustor of any preceding clause, wherein the converging combustion liner includes a first section that converges continuously from the forwardmost end to an intermediate point and a second section that converges continuously from the intermediate point to the aftmost end. The first section converges more rapidly than the second section.

The annular combustor of any preceding clause, wherein the combustion liner is a three-dimensional contoured combustion liner.

The annular combustor of any preceding clause, wherein the plurality of dimples are arranged in one or more circumferential rows in the combustion liner.

The annular combustor of any preceding clause, wherein the plurality of dimples are arranged in one or more circumferential rows in the outer liner.

The annular combustor of any preceding clause, wherein the plurality of dimples are arranged in one or more circumferential rows in the inner liner.

The annular combustor of any preceding clause, wherein the plurality of dimples are arranged in one or more outer liner circumferential rows in the outer liner and one or more inner liner circumferential rows in the inner liner.

The annular combustor of any preceding clause, wherein the one or more outer liner circumferential rows is axially offset from the one or more inner liner circumferential rows.

The annular combustor of any preceding clause, wherein the combustion liner includes a plurality of liner planks. The plurality of dimples are located in the inner liner, the outer liner, and the plurality of liner planks.

The annular combustor of any preceding clause, wherein the combustion liner includes a plurality of liner planks. The plurality of dimples are located only in the plurality of liner planks.

The annular combustor of any preceding cluse, wherein the plurality of dimples are any free form shape.

The annular combustor of any preceding clause, wherein the plurality of dimples are spherical, circular, conical, rectangular, trapezoidal, elliptical, triangular, or any combination thereof.

According to an aspect of the disclosure, an engine comprises a compressor and an annular combustor downstream of the compressor. The annular combustor includes a plurality of fuel nozzle assemblies and a combustion liner having an outer liner and an inner liner. The combustion liner comprises a plurality of dimples in the combustion liner and the annular combustor is characterized by a performance factor between one and seven, inclusive of the end points.

The engine of the preceding clause, wherein each of the plurality of dimples is circumferentially aligned with each of the plurality of fuel nozzle assemblies.

The engine of any preceding clause, wherein the performance factor is greater than or equal to one and less than or equal to three and one-half.

The engine of any preceding clause, wherein the performance factor includes a primary combustion zone performance factor and a post dilution zone performance factor. Each of the primary combustion zone performance factor and the post dilution zone performance factor is greater than or equal to one and less than or equal to seven.

The engine of claim of any preceding clause, wherein the primary combustion zone performance factor is defined by a dimple height factor of a dimple in a primary combustion zone of the annular combustor, a dimple angular position ratio of a dimple in the primary combustion zone, and a working fluid pressure drop across the annular combustor.

The engine of any preceding clause, wherein the post dilution zone performance factor is defined by a dimple height factor of a dimple in a post dilution zone of the annular combustor, a dimple angular position ratio of a dimple in the post dilution zone, and a working fluid pressure drop across the annular combustor.

The engine of any preceding clause, wherein the performance factor is defined by a dimple height factor, a dimple angular position ratio, and a working fluid pressure drop across the annular combustor.

The engine of any preceding clause, wherein the dimple height factor and the dimple angular position ratio are measured at a plane extending radially through at least one dimple of the plurality of dimples and extending perpendicular to a combustor centerline.

The engine of any preceding clause, wherein the dimple height factor is greater than or equal to 0.1 and less than or equal to 0.9.

The engine of any preceding clause, wherein the dimple height factor is greater than or equal to 0.1 and less than or equal to 0.3.

The engine of any preceding clause, wherein the dimple height factor is defined by a ratio of a height of the combustion liner to a dimple height.

The engine of any preceding clause, wherein the dimple height is taken at a maximum height of a dimple of the plurality of dimples.

The engine of any preceding clause, wherein the dimple height and the height are taken at axially the same location and circumferentially offset locations.

The engine of any preceding clause, wherein the dimple angular position ratio is greater than or equal to 0.1 and less than or equal to one.

The engine of any preceding clause, wherein the dimple angular position ratio is greater than or equal to 0.1 and less than or equal to 0.5.

The engine of any preceding clause, wherein the dimple angular position ratio defines a quantity of the plurality of dimples and an angular position of each dimple of the plurality of dimples.

The engine of any preceding clause, wherein the dimple angular position ratio is defined by a dimple angle and a fuel nozzle assembly angle.

The engine of any preceding clause, wherein the fuel nozzle assembly angle is defined by a number of fuel nozzle assemblies connected to the annular combustor and an angle between a centerline of two adjacent fuel nozzles.

The engine of any preceding clause, wherein the working fluid pressure drop is defined by a fluid pressure at an exit of the compressor and a fluid pressure at an exit of the annular combustor.

The engine of any preceding clause, wherein the working fluid pressure drop is between four percent and seven percent, inclusive of the end points.

The engine of any preceding clause, wherein the working fluid pressure drop is between 4.5 and 5.4 percent, inclusive of the end points.

The engine of any preceding clause, wherein the plurality of dimples extends radially away from the combustion chamber to enlarge a volume of the combustion chamber.

The engine of any preceding clause, further comprising a plurality of dilution holes in the combustion liner.

The engine of any preceding clause, wherein the plurality of dilution holes comprises a first plurality of dilution holes in the outer liner and a second plurality of dilution holes in the inner liner.

The engine of any preceding clause, wherein the plurality of dimples includes a plurality of dimples upstream of the plurality of dilution holes.

The engine of any preceding clause, wherein the combustion chamber defines a primary combustion zone and a post dilution zone. The plurality of dimples upstream of the plurality of dilution holes are located in the primary combustion zone.

The engine of any preceding clause, wherein the plurality of dimples includes a plurality of dimples downstream of the plurality of dilution holes.

The engine of any preceding clause, wherein the combustion chamber defines a primary combustion zone and a post dilution zone, and wherein the plurality of dimples downstream of the plurality of dilution holes are located in the post dilution zone.

The engine of any preceding clause, wherein the plurality of dimples includes a first plurality of dimples upstream of the plurality of dilution holes and a second plurality of dimples downstream of the plurality of dilution holes.

The engine of any preceding clause, wherein the first plurality of dimples includes a first plurality of outer liner dimples in the outer liner and a first plurality of inner liner dimples in the inner liner. The second plurality of dimples includes a second plurality of outer liner dimples in the outer liner and a second plurality of inner liner dimples in the inner liner.

The engine of any preceding clause, wherein the first plurality of dimples are each circumferentially aligned with a respective dimple of the second plurality of dimples.

The engine of any preceding clause, wherein the combustion liner is a converging combustion liner such that the outer liner and the inner liner converge radially toward each other from a forwardmost end of the combustion liner to an aftmost end of the combustion liner.

The engine of any preceding clause, wherein the converging combustion liner converges continuously and gradually from the forwardmost end to the aftmost end.

The engine of any preceding clause, wherein the converging combustion liner includes a first section that converges continuously from the forwardmost end to an intermediate point and a second section that converges continuously from the intermediate point to the aftmost end. The first section converges more rapidly than the second section.

The engine of any preceding clause, wherein the combustion liner is a three-dimensional contoured combustion liner.

The engine of any preceding clause, wherein the plurality of dimples are arranged in one or more circumferential rows in the combustion liner.

The engine of any preceding clause, wherein the plurality of dimples are arranged in one or more circumferential rows in the outer liner.

The engine of any preceding clause, wherein the plurality of dimples are arranged in one or more circumferential rows in the inner liner.

The engine of any preceding clause, wherein the plurality of dimples are arranged in one or more outer liner circumferential rows in the outer liner and one or more inner liner circumferential rows in the inner liner.

The engine of any preceding clause, wherein the one or more outer liner circumferential rows is axially offset from the one or more inner liner circumferential rows.

The engine of any preceding clause, wherein the combustion liner includes a plurality of liner planks. The plurality of dimples are located in the inner liner, the outer liner, and the plurality of liner planks.

The engine of any preceding clause, wherein the combustion liner includes a plurality of liner planks. The plurality of dimples are located only in the plurality of liner planks.

The engine of any preceding clause, wherein the plurality of dimples are any free form shape.

The engine of any preceding clause, wherein the plurality of dimples are spherical, circular, conical, rectangular, trapezoidal, elliptical, triangular, or any combination thereof.

A gas turbine engine for an aircraft including an engine core including one or more turbines, one or more compressors, and an annular combustor disposed downstream of the one or more compressors and upstream of the one or more turbines, the annular combustor including a combustion liner defining a combustion chamber, the combustion liner having an outer liner and an inner liner, and a plurality of dimples in the combustion liner. The combustion liner is characterized by a performance factor greater than one or equal to and less than or equal to seven.

The gas turbine engine of the preceding clause, wherein each of the plurality of dimples is circumferentially aligned with each of the plurality of fuel nozzle assemblies.

The gas turbine engine of any preceding clause, wherein the performance factor is greater than or equal to one and less than or equal to three and one-half.

The gas turbine engine of any preceding clause, wherein the performance factor includes a primary combustion zone performance factor and a post dilution zone performance factor. Each of the primary combustion zone performance factor and the post dilution zone performance factor is greater than or equal to one and less than or equal to seven.

The gas turbine engine of claim of any preceding clause, wherein the primary combustion zone performance factor is defined by a dimple height factor of a dimple in a primary combustion zone of the annular combustor, a dimple angular position ratio of a dimple in the primary combustion zone, and a working fluid pressure drop across the annular combustor.

The gas turbine engine of any preceding clause, wherein the post dilution zone performance factor is defined by a dimple height factor of a dimple in a post dilution zone of the annular combustor, a dimple angular position ratio of a dimple in the post dilution zone, and a working fluid pressure drop across the annular combustor.

The gas turbine engine of any preceding clause, wherein the performance factor is defined by a dimple height factor, a dimple angular position ratio, and a working fluid pressure drop across the annular combustor.

The gas turbine engine of any preceding clause, wherein the dimple height factor and the dimple angular position ratio are measured at a plane extending radially through at least one dimple of the plurality of dimples and extending perpendicular to a combustor centerline.

The gas turbine engine of any preceding clause, wherein the dimple height factor is greater than or equal to 0.1 and less than or equal to 0.9.

The gas turbine engine of any preceding clause, wherein the dimple height factor is greater than or equal to 0.1 and less than or equal to 0.3.

The gas turbine engine of any preceding clause, wherein the dimple height factor is defined by a ratio of a height of the combustion liner to a dimple height.

The gas turbine engine of any preceding clause, wherein the dimple height is taken at a maximum height of a dimple of the plurality of dimples.

The gas turbine engine of any preceding clause, wherein the dimple height and the height are taken at axially the same location and circumferentially offset locations.

The gas turbine engine of any preceding clause, wherein the dimple angular position ratio is greater than or equal to 0.1 and less than or equal to one.

The gas turbine engine of any preceding clause, wherein the dimple angular position ratio is greater than or equal to 0.1 and less than or equal to 0.5.

The gas turbine engine of any preceding clause, wherein the dimple angular position ratio defines a quantity of the plurality of dimples and an angular position of each dimple of the plurality of dimples.

The gas turbine engine of any preceding clause, wherein the dimple angular position ratio is defined by a dimple angle and a fuel nozzle assembly angle.

The gas turbine engine of any preceding clause, wherein the fuel nozzle assembly angle is defined by a number of fuel nozzle assemblies connected to the annular combustor and an angle between a centerline of two adjacent fuel nozzles.

The gas turbine engine of any preceding clause, wherein the working fluid pressure drop is defined by a fluid pressure at an exit of the compressor and a fluid pressure at an exit of the annular combustor.

The gas turbine engine of any preceding clause, wherein the working fluid pressure drop is between four percent and seven percent, inclusive of the end points.

The gas turbine engine of any preceding clause, wherein the working fluid pressure drop is between 4.5 and 5.4 percent, inclusive of the end points.

The gas turbine engine of any preceding clause, wherein the plurality of dimples extends radially away from the combustion chamber to enlarge a volume of the combustion chamber.

The gas turbine engine of any preceding clause, further comprising a plurality of dilution holes in the combustion liner.

The gas turbine engine of any preceding clause, wherein the plurality of dilution holes comprises a first plurality of dilution holes in the outer liner and a second plurality of dilution holes in the inner liner.

The gas turbine engine of any preceding clause, wherein the plurality of dimples includes a plurality of dimples upstream of the plurality of dilution holes.

The gas turbine engine of any preceding clause, wherein the combustion chamber defines a primary combustion zone and a post dilution zone. The plurality of dimples upstream of the plurality of dilution holes are located in the primary combustion zone.

The gas turbine engine of any preceding clause, wherein the plurality of dimples includes a plurality of dimples downstream of the plurality of dilution holes.

The gas turbine engine of any preceding clause, wherein the combustion chamber defines a primary combustion zone and a post dilution zone, and wherein the plurality of dimples downstream of the plurality of dilution holes are located in the post dilution zone.

The gas turbine engine of any preceding clause, wherein the plurality of dimples includes a first plurality of dimples upstream of the plurality of dilution holes and a second plurality of dimples downstream of the plurality of dilution holes.

The gas turbine engine of any preceding clause, wherein the first plurality of dimples includes a first plurality of outer liner dimples in the outer liner and a first plurality of inner liner dimples in the inner liner. The second plurality of dimples includes a second plurality of outer liner dimples in the outer liner and a second plurality of inner liner dimples in the inner liner.

The gas turbine engine of any preceding clause, wherein the first plurality of dimples are each circumferentially aligned with a respective dimple of the second plurality of dimples.

The gas turbine engine of any preceding clause, wherein the combustion liner is a converging combustion liner such that the outer liner and the inner liner converge radially toward each other from a forwardmost end of the combustion liner to an aftmost end of the combustion liner.

The gas turbine engine of any preceding clause, wherein the converging combustion liner converges continuously and gradually from the forwardmost end to the aftmost end.

The gas turbine engine of any preceding clause, wherein the converging combustion liner includes a first section that converges continuously from the forwardmost end to an intermediate point and a second section that converges continuously from the intermediate point to the aftmost end. The first section converges more rapidly than the second section.

The gas turbine engine of any preceding clause, wherein the combustion liner is a three-dimensional contoured combustion liner.

The gas turbine engine of any preceding clause, wherein the plurality of dimples are arranged in one or more circumferential rows in the combustion liner.

The gas turbine engine of any preceding clause, wherein the plurality of dimples are arranged in one or more circumferential rows in the outer liner.

The gas turbine engine of any preceding clause, wherein the plurality of dimples are arranged in one or more circumferential rows in the inner liner.

The gas turbine engine of any preceding clause, wherein the plurality of dimples are arranged in one or more outer liner circumferential rows in the outer liner and one or more inner liner circumferential rows in the inner liner.

The gas turbine engine of any preceding clause, wherein the one or more outer liner circumferential rows is axially offset from the one or more inner liner circumferential rows.

The gas turbine engine of any preceding clause, wherein the combustion liner includes a plurality of liner planks. The plurality of dimples are located in the inner liner, the outer liner, and the plurality of liner planks.

The gas turbine engine of any preceding clause, wherein the combustion liner includes a plurality of liner planks. The plurality of dimples are located only in the plurality of liner planks.

The gas turbine engine of any preceding clause, wherein the plurality of dimples are any free form shape.

The gas turbine engine of any preceding clause, wherein the plurality of dimples are spherical, circular, conical, rectangular, trapezoidal, elliptical, triangular, or any combination thereof.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. An annular combustor comprising:

a combustion liner defining a combustion chamber, the combustion liner having an outer liner and an inner liner; and a plurality of dimples in the combustion liner, the plurality of dimples having at least one outer liner dimple in the outer liner and at least one inner liner dimple in the inner liner, wherein the combustion liner is characterized by a performance factor greater than or equal to one and less than or equal to seven, the performance factor defined by:

$$\frac{h_,}{h} \times \frac{\phi}{\theta} \times \frac{DP}{D} \times 100,$$

where h. is the radial distance between the at least one outer liner dimple and the at least one inner liner dimple, h is the radial distance between the outer liner and the inner liner at the same axial location as the at least one outer liner dimple and the at least one inner liner dimple and at a different circumferential location with no dimple of the plurality of dimples, Ø is a dimple angle of the dimple defined by a first radial axis extending through a first edge of the at least one outer liner dimple or the at least one inner liner dimple and a second radial axis extending through a second edge of the at least one outer liner dimple or the at least one inner liner dimple, θ is a fuel nozzle angle, and $$\frac{DP}{P}$$

is a working fluid pressure drop.

2. The annular combustor of claim 1, wherein the performance factor is greater than or equal to one and less than or equal to three and one-half.

3. The annular combustor of claim 1, wherein the performance factor includes a primary combustion zone performance factor and a post dilution zone performance factor, and wherein each of the primary combustion zone performance factor and the post dilution zone performance factor is greater than or equal to one and less than or equal to seven.

4. The annular combustor of claim 3, wherein the at least one outer liner dimple and the at least one inner liner dimple are located in a primary combustion zone.

5. The annular combustor of claim 3, wherein the at least one outer liner dimple and the at least one inner liner dimple are located in a post dilution zone.

6. The annular combustor of claim 1, wherein the working fluid pressure drop is defined by a fluid pressure at an exit of a compressor and a fluid pressure at an exit of the annular combustor.

7. The annular combustor of claim 1, wherein the working fluid pressure drop is between four percent and seven percent, inclusive of the end points or between 4.5 and 5.4 percent, inclusive of the end points.

8. The annular combustor of claim 1, wherein $$\frac{h'}{h}$$

represents a dimple height factor and $$\frac{\emptyset}{\theta}$$

represents a dimple angular position ratio, and wherein the dimple height factor and the dimple angular position ratio are measured at a plane extending radially through at least one dimple of the plurality of dimples and extending perpendicular to a combustor centerline.

9. The annular combustor of claim 1, wherein $$\frac{h_,}{h}$$

represents a dimple height factor, the dimple height factor being greater than or equal to 0.1 and less than or equal to 0.9.

10. The annular combustor of claim 9, wherein the dimple height factor is greater than or equal to 0.1 and less than or equal to 0.3.

11. The annular combustor of claim 1, wherein h' is taken at a maximum height of a dimple of the plurality of dimples.

12. The annular combustor of claim 1, wherein $$\frac{\emptyset}{\theta}$$

represents a dimple angular position ratio, the dimple angular position ratio being greater than or equal to 0.1 and less than or equal to one.

13. The annular combustor of claim 12, wherein the dimple angular position ratio is greater than or equal to 0.1 and less than or equal to 0.5.

14. The annular combustor of claim 12, wherein the dimple angular position ratio defines a quantity of the plurality of dimples and an angular position of each dimple of the plurality of dimples.

15. The annular combustor of claim 1, wherein the fuel nozzle angle is defined by a number of fuel nozzle assemblies connected to the annular combustor and an angle between a centerline of two adjacent fuel nozzles.

16. A gas turbine engine for an aircraft, comprising:

an engine core including one or more turbines, one or more compressors, and the annular combustor of claim 1, the annular combustor disposed downstream of the one or more compressors and upstream of the one or more turbines.

17. An annular combustor comprising:

a combustion liner defining a combustion chamber, the combustion liner having an outer liner and an inner liner; and a plurality of dimples in the combustion liner, the plurality of dimples having at least one dimple in the outer liner or in the inner liner, wherein the combustion liner is characterized by a performance factor greater than or equal to one and less than or equal to seven, the performance factor defined by:

$$\frac{h'}{h} \times \frac{\emptyset}{\theta} \times \frac{DP}{D} \times 100,$$

where h, is the radial distance between the at least one dimple and an inner surface of the other of the outer liner or the inner liner, h is the radial distance between the outer liner and the inner liner at the same axial location as the at least one dimple and at a different circumferential location with no dimple of the plurality of dimples, Ø is a dimple angle of the dimple defined by a first radial axis extending through a first edge of the at least one dimple and a second radial axis extending through a second edge of the at least one dimple, θ is a fuel nozzle angle, and $$\frac{DP}{P}$$

is a working fluid pressure drop.

18. The annular combustor of claim 17, wherein the performance factor is greater than or equal to one and less than or equal to three and one-half.

* * * * *